United States Patent
Wu et al.

(10) Patent No.: US 11,206,638 B2
(45) Date of Patent: Dec. 21, 2021

(54) METHOD AND DEVICE FOR WIRELESS COMMUNICATION IN UE AND BASE STATION

(71) Applicant: SHANGHAI LANGBO COMMUNICATION TECHNOLOGY COMPANY LIMITED, Shanghai (CN)

(72) Inventors: KeYing Wu, Shanghai (CN); XiaoBo Zhang, Shanghai (CN); Lin Yang, Shanghai (CN)

(73) Assignee: SHANGHAI LANGBO COMMUNICATION TECHNOLOGY COMPANY LIMITED, Shanghai (CN)

( * ) Notice: Subject to any disclaimer, the term of this patent is extended or adjusted under 35 U.S.C. 154(b) by 44 days.

(21) Appl. No.: 16/392,641

(22) Filed: Apr. 24, 2019

(65) Prior Publication Data

US 2019/0335423 A1  Oct. 31, 2019

(30) Foreign Application Priority Data

Apr. 25, 2018  (CN) .......................... 201810378997.2

(51) Int. Cl.
*H04W 72/02* (2009.01)
*H04W 72/04* (2009.01)
*H04W 74/08* (2009.01)
*H04L 5/00* (2006.01)
*H04B 7/0413* (2017.01)

(52) U.S. Cl.
CPC ....... *H04W 72/02* (2013.01); *H04W 72/0453* (2013.01); *H04W 74/0816* (2013.01); *H04L 5/001* (2013.01)

(58) Field of Classification Search
None
See application file for complete search history.

(56) References Cited

U.S. PATENT DOCUMENTS

| 2016/0191175 A1* | 6/2016 | Hwang .................. H04B 15/00 370/329 |
| 2019/0150184 A1* | 5/2019 | Golitschek Edler von Elbwart ... H04L 1/1887 370/329 |
| 2019/0223215 A1* | 7/2019 | Tian ...................... H04L 1/0003 |

(Continued)

*Primary Examiner* — Ajit Patel
*Assistant Examiner* — Liem H. Nguyen
(74) *Attorney, Agent, or Firm* — Maschoff Brennan

(57) ABSTRACT

The present disclosure discloses a method and a device for wireless communication in UE and base station. The user equipment determines a first time-frequency resource block by itself on a first sub-band and transmits a first wireless signal in the first time-frequency resource block on the first sub-band. Wherein, the first wireless signal carries a first bit block and a second bit block; the first time-frequency resource block comprises a first time-frequency resource sub-block, and whether the first time-frequency resource block comprises a second time-frequency resource sub-block is related to the number of bits included in the first bit block; the second bit block is used to determine the first time-frequency resource block; The above method allows the UE to dynamically select the size of the occupied uplink wireless resource according to the size of the actual data amount, while avoiding the resource waste and the extra transmission time delay.

20 Claims, 20 Drawing Sheets

(56) References Cited

U.S. PATENT DOCUMENTS

2019/0297620 A1\* 9/2019 Tian .................... H04L 1/1812
2019/0373600 A1\* 12/2019 Takeda .............. H04W 72/0413
2020/0383132 A1\* 12/2020 Yang ................... H04L 1/1819

\* cited by examiner

| First sub-information | Second sub-information | Third sub-information | Fourth sub-information | Fifth sub-information | Sixth sub-information | Seventh sub-information | ⋮ |

Second bit block

Fig. 10

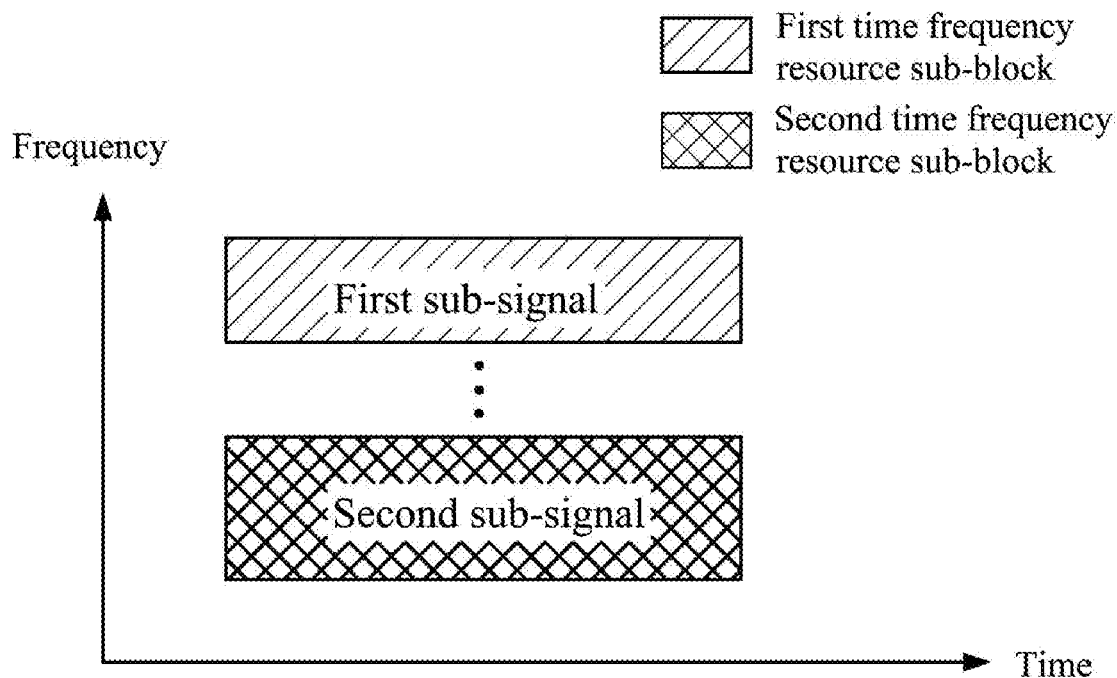

Transmit power of the first sub-signal = min { first power, first power threshold}

First power = First desired power + Second component + First coefficient x Third component + Fourth component + Fifth component Transmit power of the second sub-signal = min {second power, second power threshold}

Second power = Second desired power + Sixth component +second coefficient x seventh component + Eighth component + Ninth component

Fig. 13

| First signaling | First field | Second field | Third field | Fourth field | Fifth field | ... |

Fig. 17

| Second signaling | Sixth field | Seventh field | Eighth field | Ninth field | Tenth field | ... |

Fig. 18

METHOD AND DEVICE FOR WIRELESS COMMUNICATION IN UE AND BASE STATION

CROSS REFERENCE TO RELATED APPLICATION

This application claims the priority benefit of Chinese Patent Application Serial Number 201810378997.2, filed on Apr. 25, 2018, the full disclosure of which is incorporated herein by reference.

BACKGROUND

Technical Field

The present disclosure relates to a transmission method and device in a wireless communication system, and more particularly to a method and device in a wireless communication system that supports data transmission over Unlicensed Spectrum.

Related Art

In the traditional 3GPP (3rd Generation Partner Project) LTE (Long-term Evolution) system, data transmission can only occur on the licensed spectrum. However, with the continuous diversification of application scenarios and the sharp increase in data transmission traffic, traditional licensed spectrum may be difficult to meet the demand for data transmission traffic. The communication on the unlicensed spectrum in LTE Release 13 and Release 14 is introduced by the cellular system and used for the transmission of downlink and uplink data.

In the LAA (License Assisted Access) project of LTE, the transmitter (base station or user equipment) needs to perform LBT (Listen Before Talk) before transmitting data on the unlicensed spectrum to ensure that it does not interfere with other ongoing wireless transmission on the unlicensed spectrum. In order to avoid resource utilization degradation and delay caused by frequent LBT, Release 15 introduces AUL (Autonomous UpLink) access on the unlicensed spectrum. In the AUL, the UE (User Equipment) can perform uplink transmission autonomously in the air interface resources pre-configured by the base station.

SUMMARY

Through research, the inventors found that the amount of data required for different services is different. In the next generation of communication systems, the diversification of services will lead to great change of the amount of data transmitted in the uplink. This change is dynamic and therefore cannot be fully matched by static or semi-static resource configuration. Therefore, how to optimize the allocation of AUL resources to meet the needs of different data volumes is a problem that needs to be solved.

In view of the above problems, the present disclosure provides a solution. It should be noted that, in the case of no conflict, the features in the embodiments and embodiments in the user equipment of the present disclosure can be applied to the base station, and vice versa. The features of the embodiments and the embodiments of the present disclosure may be combined with each other arbitrarily without conflict.

The present disclosure discloses a method for wireless communication in a user equipment (UE), which comprises:

determining a first time-frequency resource block by itself in a first sub-band;

transmitting a first wireless signal in the first time-frequency resource block in the first sub-band;

wherein the first wireless signal carries a first bit block and a second bit block; the first time-frequency resource block comprises a first time-frequency resource sub-block, and whether the first time-frequency resource block comprises a second time-frequency resource sub-block is related to a number of bits included in the first bit block; the second bit block is used to determine the first time-frequency resource block, and the second bit block only occupies resource elements in the first time-frequency resource sub-block; the first time-frequency resource sub-block and the second time-frequency resource sub-block respectively comprise a positive integer number of resource elements.

In one embodiment, the problem to be solved by the present disclosure is how to meet the dynamic change of the uplink data amount under static or semi-static resource configuration. The above method solves this problem by allowing the user equipment to determine the size of the first time-frequency resource block by itself.

In one embodiment of the foregoing method, the user equipment can dynamically determine whether the first time-frequency resource block comprises the second time-frequency resource sub-block according to the size of the first bit block. The advantage of the foregoing method is that it is able to dynamically determine the size of the occupied uplink wireless resource according to the uplink data volume, which avoids the resource waste caused by allocating resource for high data volume while the actual data volume is low, as well as the additional transmission delay caused by allocating resource for low data volume while the actual data volume is high.

In one embodiment of the foregoing method, the first time-frequency resource sub-block is exclusive to the user equipment, and the second time-frequency resource sub-block may be shared by plurality of UEs including the user equipment. The above method has the advantages of ensuring the transmission reliability on the first time-frequency resource sub-block and improving the resource utilization on the second time-frequency resource sub-block at same time.

In one embodiment, the above method has the advantage that the second bit block is always transmitted on the first time-frequency resource sub-block, which ensures the transmission reliability of the second bit block.

In one embodiment, the advantage of the above-mentioned method is to indicate in the second bit block whether the first time-frequency resource block comprises the second time-frequency resource sub-block, ensuring the target receiver of the first wireless signal can accurately determine the size of the first time-frequency resource block and reduce the failure of receiving the first wireless signal due to the wrong judgment of the size of the first time-frequency resource block.

According to an aspect of the present disclosure, the method comprises:

performing first channel access detection in the first sub-band;

wherein the first channel access detection is used to determine that the first wireless signal can be transmitted in the first time-frequency resource block in the first sub-band.

According to an aspect of the present disclosure, the first time-frequency resource block comprises the second time-frequency resource sub-block; the first wireless signal comprises a first sub-signal and a second sub-signal, wherein the first sub-signal and the second sub-signal respectively occupy the resource elements in the first time-frequency resource sub-block and resource elements in the second time-frequency resource sub-block; transmission power of the first sub-signal and transmission power of the second sub-signal are not equal.

In one embodiment, the advantage of the above-mentioned method is that the transmission power of the first sub-signal and the transmission power of the second sub-signal can be optimized according to the transmission modes on the first time-frequency resource sub-block and the second time-frequency resource sub-block, respectively. For example, an orthogonal transmission mode is supported on the first time-frequency resource sub-block and a non-orthogonal transmission mode, such as NOMA (Non-Orthogonal Multiple Access, non-orthogonal multiple access), is supported on the second time-frequency resource sub-block.

According to an aspect of the present disclosure, the first time-frequency resource block comprises the second time-frequency resource sub-block, the first wireless signal comprises a first sub-signal and a second sub-signal, the first sub-signal and the second sub-signal respectively occupy the resource elements in the first time-frequency resource sub-block and resource elements in the second time-frequency resource sub-block, wherein the first sub-signal and the second sub-signal correspond to different modulation and coding schemes.

In one embodiment, the advantage of the method is that the modulation and coding schemes of the first sub-signal and the second sub-signal can be optimized according to the transmission modes on the first time-frequency resource sub-block and the second time-frequency resource sub-block, respectively, improving the transmission reliability of the first sub-signal and the second sub-signal. For example, an orthogonal transmission mode is supported on the first time-frequency resource sub-block and a non-orthogonal transmission mode is supported on the second time-frequency resource sub-block, such as NOMA.

According to an aspect of the present disclosure, the first time-frequency resource block comprises the second time-frequency resource sub-block, the first wireless signal comprises a first sub-signal and a second sub-signal, and the first sub-signal and the second sub-signal respectively occupy the resource elements in the first time-frequency resource sub-block and resource elements in the second time-frequency resource sub-block; scheduling information of the first wireless signal comprises a first multiple-access signature, the first multiple-access signature is only used to generate the second sub-signal of the first sub-signal and the second sub-signal.

In one embodiment, the advantage of the method is that an orthogonal transmission mode is supported on the first time-frequency resource sub-block and a non-orthogonal transmission mode is supported on the second time-frequency resource sub-block, thereby ensuring the transmission reliability on the first time-frequency resource sub-block and improving the resource utilization on the second time-frequency resource sub-block at the same time.

According to an aspect of the present disclosure, the method further comprises:
receiving first information;
wherein the first information is used to determine M time windows, and a time domain resource occupied by the first time-frequency resource block belongs to one of the M time windows; the M is a positive integer greater than one.

According to an aspect of the present disclosure, the method further comprises:
determining a first time window by itself in the M time windows;
wherein the time domain resource occupied by the first time-frequency resource block belongs to the first time window.

According to an aspect of the present disclosure, the method further comprises:
receiving a first signaling;
wherein the first signaling is used to determine at least a former one of the first time-frequency resource sub-block and the second time-frequency resource sub-block.

According to an aspect of the present disclosure, the method further comprises:
receiving a second signaling;
wherein the second signaling indicates whether the first bit block is correctly received.

The present disclosure discloses a method for wireless communication in a base station, which comprises:
determining whether a first time-frequency resource block on a first sub-band comprises a second time-frequency resource sub-block, and receiving a first wireless signal in the first time-frequency resource block in the first sub-band;
wherein the first wireless signal carries a first bit block and a second bit block; the first time-frequency resource block comprises a first time-frequency resource sub-block, and whether the first time-frequency resource block comprises the second time-frequency resource sub-block is related to a number of bits included in the first bit block; the second bit block is used to determine the first time-frequency resource block, and the second bit block only occupies resource elements in the first time-frequency resource sub-block; the first time-frequency resource sub-block and the second time-frequency resource sub-block respectively comprise a positive integer number of resource elements.

According to an aspect of the present disclosure, the first time-frequency resource block comprises the second time-frequency resource sub-block, and the first wireless signal comprises a first sub-signal and a second sub-signal; the first sub-signal and the second sub-signal respectively occupy the resource elements in the first time-frequency resource sub-block and resource elements in the second time-frequency resource sub-block; transmission power of the first sub-signal and transmission power of the second sub-signal are not equal.

According to an aspect of the present disclosure, the first time-frequency resource block comprises the second time-frequency resource sub-block; the first wireless signal comprises a first sub-signal and a second sub-signal, and the first sub-signal and the second sub-signal respectively occupy the resource elements in the first time-frequency resource sub-block and resource elements in the second time-frequency resource sub-block, wherein the first sub-signal and the second sub-signal correspond to different modulation and coding schemes.

According to an aspect of the present disclosure, the first time-frequency resource block comprises the second time-frequency resource sub-block, the first wireless signal comprises a first sub-signal and a second sub-signal, and the first sub-signal and the second sub-signal respectively occupy the resource elements in the first time-frequency resource sub-block and resource elements in the second time-frequency resource sub-block, wherein scheduling information of the first wireless signal comprises a first multiple-access signature; the first multiple-access signature is only used to generate the second sub-signal of the first sub-signal and the second sub-signal.

According to an aspect of the present disclosure, the method comprises:

transmitting first information;

wherein the first information is used to determine M time windows, and a time domain resource occupied by the first time-frequency resource block belongs to a time window of the M time windows; the M is a positive integer greater than 1.

According to an aspect of the present disclosure, the method further comprises:

monitoring the first wireless signal in the M time windows, and successfully detecting the first wireless signal in a first time window;

wherein the time domain resource occupied by the first time-frequency resource block belongs to the first time window.

According to an aspect of the present disclosure, the method further comprises:

transmitting a first signaling;

wherein the first signaling is used to determine at least a former one of the first time-frequency resource sub-block and the second time-frequency resource sub-block.

According to an aspect of the present disclosure, the method further comprises:

transmitting a second signaling;

wherein the second signaling indicates whether the first bit block is correctly received.

The present disclosure discloses a user equipment (UE) for a wireless communication, which comprises:

a first processor determining a first time-frequency resource block by itself in a first sub-band;

a first transmitter transmitting the first wireless signal in the first time-frequency resource block in the first sub-band;

wherein the first wireless signal carries a first bit block and a second bit block; the first time-frequency resource block comprises a first time-frequency resource sub-block, and whether the first time-frequency resource block comprises a second time-frequency resource sub-block is related to a number of bits included in the first bit block; the second bit block is used to determine the first time-frequency resource block, and the second bit block only occupies resource elements in the first time-frequency resource sub-block; the first time-frequency resource sub-block and the second time-frequency resource sub-block respectively comprise a positive integer number of resource elements.

In one embodiment of the user equipment used for wireless communication mentioned above, the first processor performs first channel access detection in the first sub-band; wherein the first channel access detection is used determining that the first wireless signal can be transmitted in the first time-frequency resource block in the first sub-band.

In one embodiment of the user equipment used for wireless communication mentioned above, the first time-frequency resource block comprises the second time-frequency resource sub-block, and the first wireless signal comprises a first sub-signal and a second sub-signal, the first sub-signal and the second sub-signal respectively occupy the resource elements in the first time-frequency resource sub-block and resource elements in the second time-frequency resource sub-block, transmission power of the first sub-signal and transmission power of the second sub-signal are not equal.

In one embodiment of the user equipment used for wireless communication mentioned above, the first time-frequency resource block comprises the second time-frequency resource sub-block, and the first wireless signal comprises a first sub-signal and a second sub-signal, the first sub-signal and the second sub-signal respectively occupy the resource elements in the first time-frequency resource sub-block and resource elements in the second time-frequency resource sub-block, wherein the first sub-signal and the second sub-signal correspond to different modulation and coding schemes.

In one embodiment of the user equipment used for wireless communication mentioned above, the first time-frequency resource block comprises the second time-frequency resource sub-block, the first wireless signal comprises a first sub-signal and a second sub-signal, and the first sub-signal and the second sub-signal respectively occupy the resource elements in the first time-frequency resource sub-block and resource elements in the second time-frequency resource sub-block, wherein scheduling information of the first wireless signal comprises a first multiple-access signature; the first multiple-access signature is only used to generate the second sub-signal of the first sub-signal and the second sub-signal.

In one embodiment of the user equipment used for wireless communication mentioned above, the first processor receives first information; wherein the first information is used to determine M time windows; a time domain resource occupied by the first time-frequency resource block belongs to a time window of the M time windows; the M is a positive integer greater than 1.

In one embodiment of the user equipment used for wireless communication mentioned above, the first processor further determines a first time window in the M time windows, wherein the time domain resource occupied by the first time-frequency resource block belongs to the first time window.

In one embodiment of the user equipment used for wireless communication mentioned above, the first processor further receives a first signaling; wherein the first signaling is used to determine at least a former one of the first time-frequency resource sub-block and the second time-frequency resource sub-block.

In one embodiment of the user equipment used for wireless communication mentioned above, the first processor further receives a second signaling, wherein the second signaling indicates whether the first bit block is correctly received.

The present disclosure discloses a base station device used for wireless communication, which comprises:

a second processor determining whether a first time-frequency resource block in a first sub-band comprises a second time-frequency resource sub-block, and receiving a first wireless signal in the first time-frequency resource block in the first sub-band;

wherein the first wireless signal carries a first bit block and a second bit block; the first time-frequency resource block comprises a first time-frequency resource sub-block, and whether the first time-frequency resource block comprises the second time-frequency resource sub-block is related to a number of bits included in the first bit block; the second bit block is used to determine the first time-frequency resource block, and the second bit block only occupies resource elements in the first time-frequency resource sub-block; the first time-frequency resource sub-block and the second time-frequency resource sub-block respectively comprise a positive integer number of resource elements.

In one embodiment of the base station equipment used for wireless communication mentioned above, the first time-frequency resource block comprises the second time-frequency resource sub-block, and the first wireless signal comprises a first sub-signal and a second sub-signal; the first sub-signal and the second sub-signal respectively occupy the resource elements in the first time-frequency resource sub-block and resource elements in the second time-frequency resource sub-block; transmission power of the first sub-signal and transmission power of the second sub-signal are not equal.

In one embodiment of the base station equipment used for wireless communication mentioned above, the first time-frequency resource block comprises the second time-frequency resource sub-block, the first wireless signal comprises a first sub-signal and a second sub-signal, and the first sub-signal and the second sub-signal respectively occupy the resource elements in the first time-frequency resource sub-block and resource elements in the second time-frequency resource sub-block, wherein the first sub-signal and the second sub-signal correspond to different modulation and coding schemes.

In one embodiment of the base station equipment used for wireless communication mentioned above, the first time-frequency resource block comprises the second time-frequency resource sub-block, the first wireless signal comprises a first sub-signal and a second sub-signal, and the first sub-signal and the second sub-signal respectively occupy the resource elements in the first time-frequency resource sub-block and resource elements in the second time-frequency resource sub-block, wherein scheduling information of the first wireless signal comprises a first multiple-access signature; the first multiple-access signature is only used to generate the second sub-signal of the first sub-signal and the second sub-signal.

In one embodiment, the base station equipment used for wireless communication mentioned above comprises:
 a second transmitter transmitting first information;
 wherein the first information is used to determine M time windows, and a time domain resource occupied by the first time-frequency resource block belongs to a time window of the M time windows; the M is a positive integer greater than 1.

In one embodiment of the base station equipment used for wireless communication mentioned above, the second processor monitors the first wireless signal in the M time windows, and successfully detecting the first wireless signal in a first time window; wherein the time domain resource occupied by the first time-frequency resource block belongs to the first time window.

In one embodiment of the base station equipment used for wireless communication mentioned above, the second transmitter further transmits a first signaling; wherein the first signaling is used to determine at least a former one of the first time-frequency resource sub-block and the second time-frequency resource sub-block.

In one embodiment of the base station equipment used for wireless communication mentioned above, the second transmitter further transmits a second signaling; wherein the second signaling indicates whether the first bit block is correctly received.

In one embodiment, the present disclosure has the following advantages compared with the traditional solution:

In the grant-free uplink transmission, the UE is allowed to dynamically select the size of the occupied uplink wireless resource according to the current actual data volume; so that the occupancy of the uplink wirelesses resource can match the dynamic change of the uplink data volume. The present disclosure not only avoids the resources waste caused by allocating resource for high data volume while the actual data volume is low, but also avoids the additional transmission delay caused by allocation resources for low data volume while the actual data volume is high.

The wireless resources that can be occupied by the grant free uplink transmission are classified into two types: the first type of wireless resources is exclusively allocated to a single UE, and the second type of wireless resources is shared by multiple UEs. In this way, the reliability of the wireless signal transmitted on the first type of wireless resources can be ensured, and the utilization of the second type of wireless resources is improved.

The transmission power or/and modulation and coding schemes adopted by each UE on the first type of wireless resources and the second type of wireless resources are optimized for the transmission modes (such as orthogonal and non-orthogonal) on the two types of wireless resources, respectively, thus improving the transmission reliability.

The size of the currently occupied uplink wireless resource is indicated in the uplink control information, and the uplink control information is always transmitted on the first type of wireless resources, so that the uplink control information can be accurately received, at the same time, the receiving failure due to the wrong judgment of the size of the uplink wireless resource by the target receiver is avoided.

BRIEF DESCRIPTION OF THE DRAWINGS

Other features, objects, and advantages of the present disclosure will become more apparent from the detailed description of the accompanying drawings.

FIG. 10 shows a schematic diagram of information carried by a second bit block according to one embodiment of the present disclosure;

FIG. 13 shows a schematic diagram of resource mapping and transmission power of a first sub-signal and a second sub-signal on a time-frequency domain according to one embodiment of the present disclosure;

FIG. 17 shows a schematic diagram of first signaling according to one embodiment of the present disclosure;

FIG. 18 shows schematic diagram of second signaling according to one embodiment of the present disclosure;

DETAILED DESCRIPTION OF THE EMBODIMENTS

The following description with reference to the accompanying drawings is provided to explain the exemplary embodiments of the disclosure. Note that in the case of no conflict, the embodiments of the present disclosure and the features of the embodiments may be arbitrarily combined with each other.

Embodiment I

Figure 1:
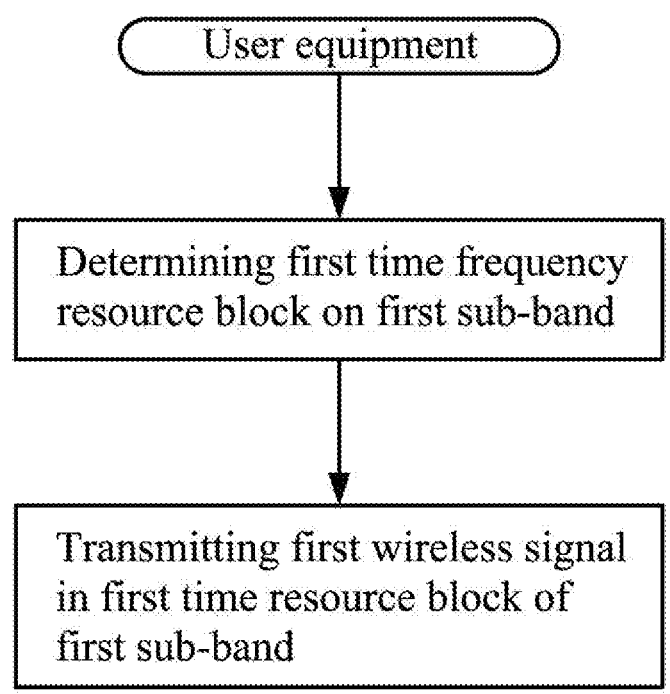
FIG. 1 shows a flowchart of self-determining a first time-frequency resource block and transmitting a first wireless signal according to one embodiment of the present disclosure.

Embodiment I illustrates a flow chart of first information and first wireless signal, as shown in FIG. 1.

In Embodiment I, the user equipment in this disclosure determines the first time-frequency resource block by itself in the first sub-band; and then transmits the first wireless signal in the first time-frequency resource block in the first sub-band. Wherein the first wireless signal carries a first bit block and a second bit block; the first time-frequency resource block comprises a first time-frequency resource sub-block, and whether the first time-frequency resource block comprises a second time-frequency resource sub-block is related to the number of bits included in the first bit block; the second bit block is used to determine the first time-frequency resource block, and the second bit block only occupies resource elements in the first time-frequency resource sub-block; the first time-frequency resource sub-block and the second time-frequency resource sub-block respectively comprise a positive integer number of resource elements.

In one embodiment, the first sub-band is deployed in an unlicensed spectrum.

In one embodiment, the first sub-band includes one carrier.

In one embodiment, the first sub-band includes a plurality of carriers.

In one embodiment, the first sub-band includes one BWP (Bandwidth Part) in one carrier.

In one embodiment, the first sub-band includes a plurality of BWPs in one carrier.

In one embodiment, the first sub-band includes a positive integer number of consecutive sub-carriers in the frequency domain.

In one embodiment, the phrase of determining a first time-frequency resource block by itself in a first sub-band means determining by itself in the first sub-band whether the first time-frequency resource block comprises the second time-frequency resource sub-block.

In one embodiment, the phrase of determining a first time-frequency resource block by itself in a first sub-band means that according to the number of bits included in the first bit block, determining by itself in the first sub-band whether the first time-frequency resource block comprises the second time-frequency resource sub-block.

In one embodiment, if the number of bits included in the first bit block is greater than a first threshold, the first time-frequency resource block comprises the second time-frequency resource sub-block; otherwise, the first time-frequency resource block does not comprise the second time-frequency resource sub-block; the first threshold is a positive integer.

In an embodiment, if the first time-frequency resource block comprises the second time-frequency resource sub-block, the first time-frequency resource block is composed of the first time-frequency resource sub-block and the second time-frequency resource sub-block; otherwise, the first time-frequency resource block is composed of the first time-frequency resource sub-block.

In one embodiment, the first bit block includes a positive integer number of bits.

In one embodiment, all of the bits in the first bit block are arranged in sequence.

In one embodiment, the second bit block includes a positive integer number of bits.

In one embodiment, all of the bits in the second block of bits are arranged in sequence.

In one embodiment, the first bit block is a TB (Transport Block).

In one embodiment, the first bit block is composed of one TB and a check bit block of the one TB, and the check bit block of the one TB is generated by a CRC (Cyclic Redundancy Check) bit block of the one TB.

In one embodiment, the first bit block includes uplink data.

In one embodiment, the second bit block includes UCI (Uplink Control Information).

In one embodiment, the second bit block includes AUL (Autonomous UpLink)-UCI.

In one embodiment, a resource element is an RE (Resource Element).

In one embodiment, a resource element occupies one multi-carrier symbol in the time domain and one sub-carrier in the frequency domain.

In one embodiment, the multi-carrier symbol is an OFDM (Orthogonal Frequency Division Multiplexing) symbol.

In one embodiment, the multi-carrier symbol is an SC-FDMA (Single Carrier-Frequency Division Multiple Access) symbol.

In one embodiment, the multi-carrier symbol is a DFT-S-OFDM (Discrete Fourier Transform Spread OFDM) symbol.

In an embodiment, the first time-frequency resource block comprises only the first time-frequency resource sub-block of the first time-frequency resource sub-block and the second time-frequency resource sub-block.

In one embodiment, the first time-frequency resource block comprises the first time-frequency resource sub-block and the second time-frequency resource sub-block.

In one embodiment, the phrase that the first wireless signal carries a first bit block and a second bit block means that the first wireless signal is an output after all or part of the bits in the first bit block and the second bit block is sequentially subjected to some or all of CRC Attachment, Segmentation, code block CRC Attachment, Channel Coding, Rate Matching, Concatenation, Interleaving, Bit level Scrambling, Modulation Mapper, Spreading/Scrambling, Layer Mapper, transform precoder (for generating complex-valued signals), Precoding, Resource Element Mapper, multi-carrier symbol generation, and Modulation and Upconversion.

In one embodiment, the phrase that the first wireless signal carries a first bit block and a second bit block means that the first bit block and the second bit block are used to generate the first wireless signal.

In one embodiment, the second bit block is used to determine whether the first time-frequency resource block comprises the second time-frequency resource sub-block.

In one embodiment, the second bit block indicates whether the first time-frequency resource block comprises the second time-frequency resource sub-block.

In one embodiment, the second bit block explicitly indicates whether the first time-frequency resource block comprises the second time-frequency resource sub-block.

In an embodiment, the second bit block implicitly indicates whether the first time-frequency resource block comprises the second time-frequency resource sub-block.

In one embodiment, the first bit block occupies the resource elements in the first time-frequency resource sub-block.

In one embodiment, the first bit block occupies the resource elements in the first time-frequency resource sub-block and in the second time-frequency resource sub-block.

In an embodiment, the first time-frequency resource block comprises the second time-frequency resource sub-block, and the first bit block occupies the resource elements in the first time-frequency resource sub-block and the second time-frequency resource sub-block.

As an embodiment, the first time-frequency resource block does not comprise the second time-frequency resource sub-block, and the first bit block only occupies the resource elements in the first time-frequency resource sub-block of the first time-frequency resource sub-block and the second time-frequency resource sub-block.

In one embodiment, the second bit block does not occupy resource elements in the second time-frequency resource sub-block.

Embodiment II

Figure 2:
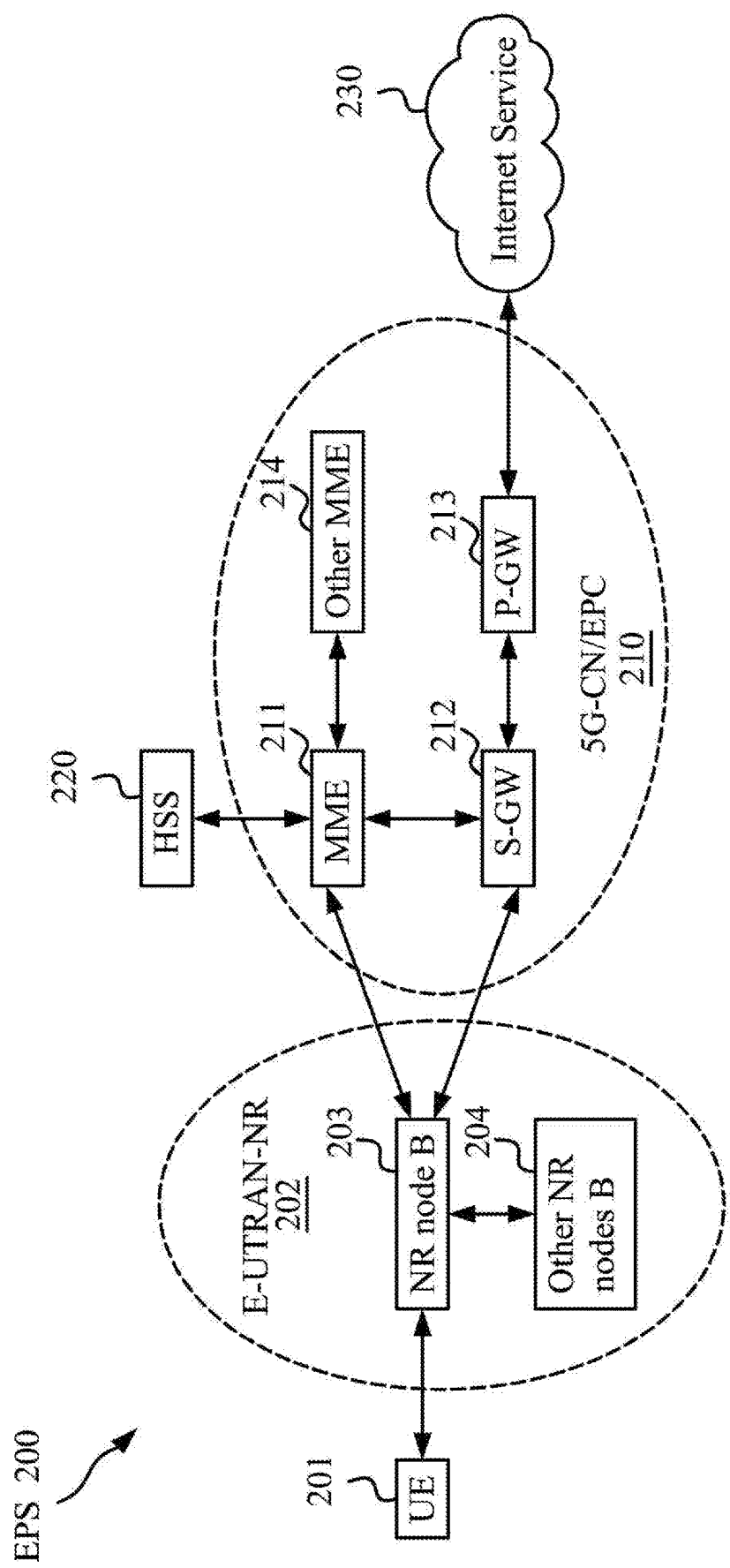
FIG. 2 shows a schematic diagram of network architecture according to one embodiment of the present disclosure.

Embodiment II shows a schematic diagram of network architecture, as shown in FIG. 2.

Embodiment II illustrates a schematic diagram of a network architecture according to the present discloses, as shown in FIG. 2.

FIG. 2 describes a system network structure 200 of NR 5G, LTE (long-term evolution) and LTE-A (long-term evolution advanced). The network architecture 200 of NR 5G or LTE may be referred to as an EPS (evolve packet system) 200 or some other suitable terminology. The EPS 200 may include one or more UEs 201, NG-RAN (radio access network) 202, 5G-CN (core network)/EPC (evolved packet core) 210, HSS (Home Subscriber Server) 220 and the internet service 230. EPS may be interconnected with other access networks, but for the sake of simplicity, these entities/interfaces are not shown. As shown in FIG. 2, the EPS provides the packet switching services. Those skilled in the art would readily appreciate that the various concepts presented throughout this disclosure can be extended to networks or other cellular networks that provide circuit switched services. The NG-RAN includes an NR Node B (gNB) 203 and other gNBs 204. The gNB 203 provides user and control plane protocol termination for the UE 201. The gNB 203 can be connected to other gNBs 204 via an Xn interface (e.g., a backhaul). The gNB 203 may also be referred to as a base station, a base transceiver station, a wireless base station, a wireless transceiver, a transceiver function, a basic service set (BSS), an extended service set (ESS), a TRP (transmission and reception point), or some other suitable terminology. The gNB 203 provides the UE201 with an access point to the 5G-CN/EPC 210. In the embodiment, the UE201 includes cellular telephones, smart phones, Session Initiation Protocol (SIP) phones, laptop computers, personal digital assistants (PDAs), satellite wirelesses, non-terrestrial base station communications, satellite mobile communications, global positioning systems, multimedia devices, Video devices, digital audio player (e.g. MP3 players), cameras, game consoles, drones, aircrafts, narrow-band physical network devices, machine type communication devices, land vehicles, cars, wearable devices, or any other similar to functional devices. A person skilled in the art may also refer to UE 201 as a mobile station, a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, remote terminal, handset, user agent, mobile client, client or some other suitable term. The gNB 203 is connected to the 5G-CN/EPC 210 through an S1/NG interface. 5G-CN/EPC 210 includes MME/AMF/UPF 211, other MME (Mobility Management Entity)/AMF (Authentication Management Field)/UPF (User Plane Function) 214 An S-GW (Service Gateway) 212 and a P-GW (Packet Date Network Gateway) 213. The MME/AMF/UPF 211 is a control node that handles signaling between the UE 201 and the 5G-CN/EPC 210. In general, MME/AMF/UPF 211 provides bearer and connection management. All User IP (Internet Protocol) packets are transmitted through the S-GW 212, and the S-GW 212 itself is connected to the P-GW 213. The P-GW 213 provides UE IP address allocation as well as other functions. The P-GW 213 is connected to the internet service 230. The internet service 230 includes an operator-compatible internet protocol service, and may specifically include the Internet, an intranet, an IMS (IP Multimedia Subsystem), and a packet switching service.

In a sub-embodiment, the gNB203 corresponds to the base station in this disclosure.

In a sub-embodiment, the UE 201 corresponds to the user equipment in this disclosure.

In a sub-embodiment, the UE201 supports the data transmission in the unlicensed spectrum in a wireless communication.

In a sub-embodiment, the gNB203 supports the data transmission in the unlicensed spectrum in a wireless communication.

Embodiment III

Figure 3:
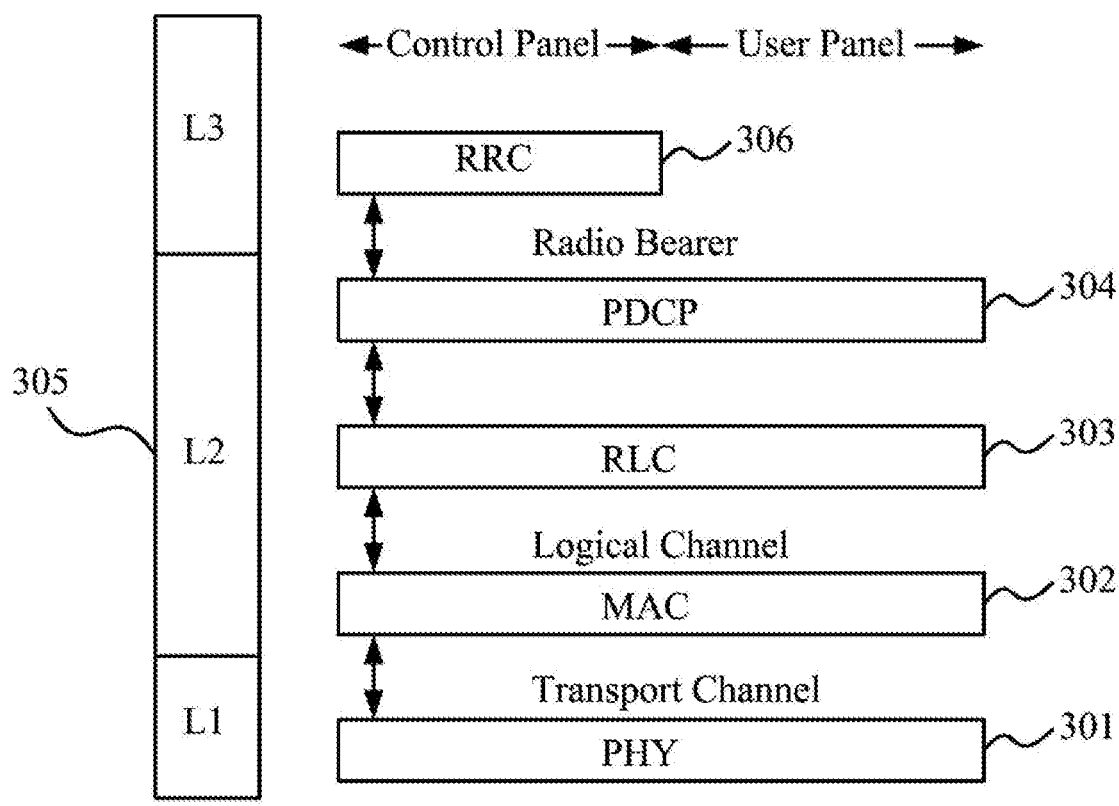
FIG. 3 shows a schematic diagram of a wireless protocol architecture of a user plane and a control plane according to one embodiment of the present disclosure.

Embodiment III shows a schematic diagram of a wireless protocol architecture of a user plane and a control plane according to the present disclosure, as shown in FIG. 3.

FIG. 3 is a schematic diagram illustrating an embodiment of a wireless protocol architecture for a user plane and a control plane, and FIG. 3 shows a wireless protocol architecture for the user equipment (UE) and the base station equipment (gNB or eNB) in three layers: layer 1, layer 2 and layer 3. Layer 1 (L1 layer) is the lowest layer and implements various physical layer (PHY) signal processing functions, and layers above layer 1 belong to higher layers. The L1 layer will be referred to herein as PHY 301. Layer 2 (L2 layer) 305 is above PHY 301 and is responsible for the link between the UE and the gNB through PHY 301. In the user plane, L2 layer 305 comprises a media access control (MAC) sub-layer 302, a radio link control (RLC) sub-layer 303 and a packet data convergence protocol (PDCP) sub-layer 304, and these sub-layers terminate at the gNB on the network side. Although not illustrated, the UE may have several upper layers above the L2 layer 305, including a network layer (e.g. an IP layer) terminated at the P-GW on the network side and terminated at the other end of the connection (e.g. Application layer at the remote UE, server, etc.). The PDCP sub-layer 304 provides multiplexing between different wireless bearers and logical channels. The PDCP sublayer 304 also provides header compression for upper layer data packets to reduce wireless transmission overhead, and provides the security by encrypting data packets, and provides handoff support for UEs between gNBs. The RLC sublayer 303 provides segmentation and reassembly of upper layer data packets, retransmission of lost packets and the reordering of data packets to compensate for the disordered reception resulted by the hybrid automatic repeat request (HARQ). The MAC sublayer 302 provides multiplexing between the logical and transport channels. The MAC sublayer 302 is also responsible for allocating various wireless resources (e.g. resource blocks) in one cell between UEs. The MAC sublayer 302 is also responsible for HARQ operations. In the control plane, the wireless protocol architecture for the UE and gNB is substantially the same for the physical layer 301 and the L2 layer 305, but there is no header compression function for the control plane. The control plane also includes an RRC (Wireless Resource Control) sublayer 306 in Layer 3 (L3 layer). The RRC sublayer 306 is responsible for obtaining wireless resources (i.e. wireless bearers) and configuring the lower layer using RRC signaling between the gNB and the UE.

In one embodiment, the wireless protocol architecture of FIG. 3 is applicable to the user equipment in this disclosure.

In one embodiment, the wireless protocol architecture of FIG. 3 is applicable to the base station in this disclosure.

In one embodiment, the first wireless signal in the present disclosure is generated in the PHY 301.

In one embodiment, the first bit block in the present disclosure is generated in the RRC sublayer 306.

In one embodiment, the second bit block in the present disclosure is generated in the PHY 301.

In one embodiment, the second bit block in the present disclosure is generated in the MAC sublayer 302.

In one embodiment, the first information in the present disclosure is generated in the RRC sublayer 306.

In one embodiment, the first signaling in the present disclosure is generated in the PHY 301.

In one embodiment, the first signaling in the present disclosure is generated in the MAC sublayer 302.

In one embodiment, the second signaling in the present disclosure is generated in the PHY 301.

In one embodiment, the second signaling in the present disclosure is generated in the MAC sublayer 302.

Embodiment IV

Figure 4:
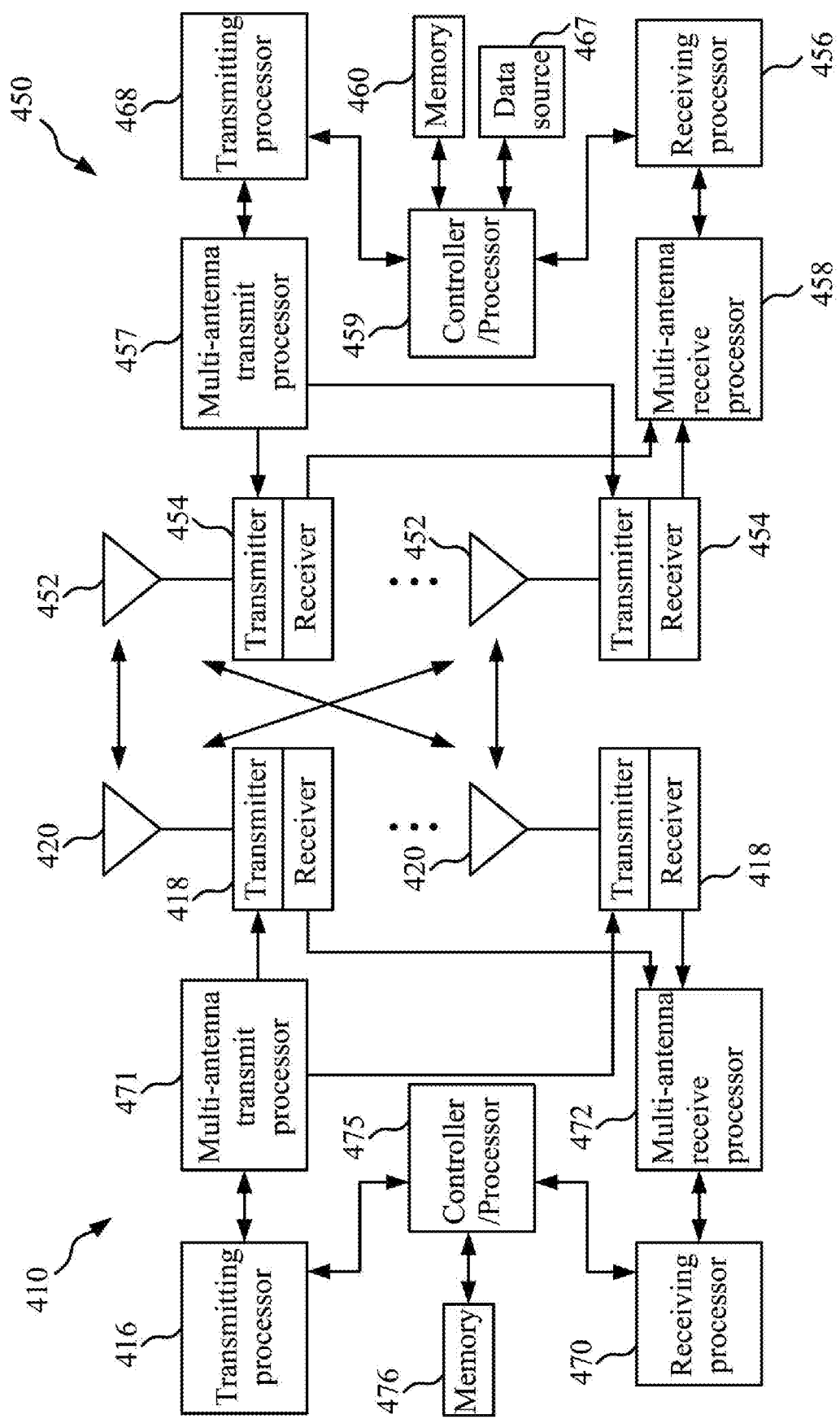
FIG. 4 shows a schematic diagram of an NR (New Radio) node and a UE according to one embodiment of the present disclosure.

Embodiment IV shows a schematic diagram of an NR node and a UE, as shown in FIG. 4. FIG. 4 is a block diagram of a gNB 410 in communication with a UE 450 in an access network.

The gNB 410 includes a controller/processor 475, a memory 476, a receiving processor 470, a transmitting processor 416, a multi-antenna receiving processor 472, a multi-antenna transmitting processor 471, a transmitter/receiver 418, and an antenna 420.

The user equipment 450 includes a controller/processor 459, a memory 460, a data source 467, a transmitting processor 468, a receiving processor 456, a multi-antenna transmitting processor 457, a multi-antenna receiving processor 458, a transmitter/receiver 454, and an antenna 452.

In DL (Downlink), at gNB 410, upper layer data packets from the core network are provided to controller/processor 475. The controller/processor 475 implements the L2 layer functionality. In the DL, the controller/processor 475 provides header compression, encryption, packet segmentation and reordering, multiplexing between logical and transport channels, and wireless resource allocation for the UE 450 based on various priority metrics. The controller/processor 475 is also responsible for HARQ operations, retransmission of lost packets, and signaling to the UE 450. Transmitting processor 416 and multi-antenna transmitting processor 471 implement various signal processing functions for the L1 layer (i.e., the physical layer). Transmitting processor 416 performs encoding and interleaving to facilitate forward error correction (FEC) at UE 450, mapping of signal clusters based on various modulation schemes (e.g., binary phase shift keying (BPSK), quadrature phase shift keying (QPSK), M-phase shift keying (M-PSK), M quadrature amplitude modulation (M-QAM)). The multi-antenna transmitting processor 471 performs digital spatial precoding of coded and modulated symbols, comprising codebook based precoding and non-codebook based precoding, beamforming processing, and generating one or more spatial streams. The transmitting processor 416 then maps each spatial stream to sub-carriers, multiplexes with reference signals (e.g., pilots) in the time and/or frequency domain, and then uses an inverse fast Fourier transform (IFFT) to generate a physical channel carrying a time-domain multicarrier symbol stream. The multi-antenna transmitting processor 471 then transmits an analog precoding/beamforming operation to the time domain multi-carrier symbol stream. Each transmitter 418 converts the baseband multicarrier symbol stream provided by the multi-antenna transmitting processor 471 into a radio frequency stream, which is then provided to a different antenna 420.

In DL (Downlink), at UE 450, each receiver 454 receives a signal through its corresponding antenna 452. Each receiver 454 recovers the information modulated onto the radio frequency carrier and converts the radio frequency stream into a baseband multi-carrier symbol stream for providing to the receiving processor 456. The receiving processor 456 and multi-antenna receiving processor 458 implement various signal processing functions at the L1 layer. The multi-antenna receiving processor 458 performs a receiving analog precoding/beamforming operation of the baseband multicarrier symbol stream from receiver 454. The receiver processor 456 converts the received analog pre-coded/beamforming operated baseband multicarrier symbol stream from time domain to frequency domain using Fast Fourier transform (FFT). In the frequency domain, the physical layer data signal and the reference signal are demultiplexed by the receiving processor 456, wherein the reference signal will be used for channel estimation, and the data signal is recovered by the multi-antenna detection in the multi-antenna receiving processor 458 to any spatial stream for the UE 450 destinations. The symbols on each spatial stream are demodulated and recovered in the receiving processor 456 and generated soft decision. The receiving processor 456 then decodes and deinterleaves the soft decision to recover the upper layer data and control signals transmitted by the gNB 410 on the physical channel. The upper layer data and control signals are then provided to the controller/processor 459. The controller/processor 459 implements the functions of the L2 layer. The controller/processor 459 can be associated with memory 460 that stores program codes and data. The memory 460 can be referred to as a computer readable medium. In the DL, the controller/processor 459 provides demultiplexing, packet reassembly, decryption, header decompression, and control signal processing between the transport and logical channels to recover upper layer packets that came from the core network. The upper layer packet is then provided to all protocol layers above the L2 layer. Various control signals can also be provided to L3 for L3 processing. The controller/processor 459 is also responsible for error detection using an acknowledgement (ACK) and/or negative acknowledgement (NACK) protocol to support HARQ operations.

In UL (Uplink), at UE 450, data source 467 is used to provide upper layer data packets to the controller/processor 459. The data source 467 represents all protocol layers above the L2 layer. Similar to the transmitting function at gNB 410 described in the DL, the controller/processor 459 implements header compression, encryption, packet segmentation and reordering, and multiplexing between the logical and transport channels based on the wireless resource allocation of the gNB 410, to implement L2 layer functions for the user plane and control plane. The controller/processor 459 is also responsible for HARQ operations, retransmission of lost packets, and signaling to the gNB 410. The transmitting processor 468 performs modulation mapping, channel coding processing, and the multi-antenna transmitting processor 457 performs digital multi-antenna spatial precoding, including codebook based precoding and non-codebook based precoding, and beamforming processing, followed by transmitting Processor 468 modulates the generated spatial stream into a multi-carrier/single-carrier symbol stream, which is provided to different antennas 452 via transmitter 454 after an analog pre-coding/beamforming operation in multi-antenna transmitting processor 457. Each transmitter 454 first converts the baseband symbol stream provided by the multi-antenna transmit processor 457 into a stream of radio frequency symbols and provides it to the antenna 452.

In UL (Uplink), the function at gNB 410 is similar to the receiving function at UE 450 described in the DL. Each receiver 418 receives a radio frequency signal through its respective antenna 420, converts the received radio frequency signal into a baseband signal, and provides the baseband signal to the multi-antenna receiving processor 472 and the receiving processor 470. The receiving processor 470 and the multi-antenna receiving processor 472 collectively implement the functions of the L1 layer. The controller/processor 475 implements the L2 layer function. The controller/processor 475 can be associated with the memory 476 that stores program codes and data. The memory 476 can be referred to as a computer readable medium. In the UL, the controller/processor 475 provides demultiplexing, packet reassembly, decryption, header decompression, control signal processing between the transport and logical channels to recover upper layer data packets that came from the UE 450. The upper layer data packets from the controller/processor 475 can be provided to the core network. The controller/processor 475 is also responsible for error detection using ACK and/or NACK protocols to support HARQ operations.

In one embodiment, the UE 450 includes: at least one processor and at least one memory, the at least one memory including computer program codes; the at least one memory and the computer program code are configured to operate with at least one processor together, the UE 450 equipment at least: determining the first time-frequency resource block in this disclosure by itself in the first sub-band in this disclosure; transmitting the first wireless signal in this disclosure in the first time-frequency resource block in the first sub-band. Wherein, the first wireless signal carries a first bit block and a second bit block; the first time-frequency resource block comprises a first time-frequency resource sub-block, and whether the first time-frequency resource block comprises a second time-frequency resource sub-block is related to the number of bits included in the first bit block; the second bit block is used to determine the first time-frequency resource block, and the second bit block only occupies the resource elements in the first time-frequency resource sub-block; the first time-frequency resource sub-block and the second time-frequency resource sub-block respectively comprise a positive integer number of resource elements.

In one sub-embodiment, the UE 450 includes a memory storing a computer readable instruction program, which generates an action when executed by at least one processor, and the action comprises: determining the first time-frequency resource block in the present disclosure by itself in the first sub-band in the present disclosure; transmitting the first wireless signal in this disclosure in the first time-frequency resource block in the first sub-band. Wherein, the first wireless signal carries a first bit block and a second bit block; the first time-frequency resource block comprises a first time-frequency resource sub-block, and whether the first time-frequency resource block comprises a second time-frequency resource sub-block is related to the number of bits included in the first bit block; the second bit block is used to determine the first time-frequency resource block, and the second bit block only occupies the resource elements in the first time-frequency resource sub-block; the first time-frequency resource sub-block and the second time-frequency resource sub-block respectively comprise a positive integer number of resource elements.

In one sub-embodiment, the gNB 410 device includes: at least one processor and at least one memory, the at least one memory includes computer program codes; the at least one memory and the computer program code are configured to be operated with at least one processor together. The gNB 410 device at least: determining whether the first time-frequency resource block in the first sub-band in this disclosure comprises the second time-frequency resource sub-block in the present disclosure, and receiving the first wireless signal in the present disclosure in the first time-frequency resource block in the first sub-band. Wherein, the first wireless signal carries a first bit block and a second bit block; the first time-frequency resource block comprises a first time-frequency resource sub-block, and whether the first time-frequency resource block comprises the second time-frequency resource sub-block is related to the number of bits included in the first bit block; the second bit block is used to determine the first time-frequency resource block, and the second bit block only occupies the resource elements in the first time-frequency resource sub-block; the first time-frequency resource sub-block and the second time-frequency resource sub-block respectively comprise a positive integer number of resource elements.

In one embodiment, the gNB 410 includes: a memory storing a computer readable instruction program that, when executed by at least one processor, generates an action, the action comprising: determining whether the first time-frequency resource block in the first sub-band in this disclosure comprises the second time-frequency resource sub-block in the present disclosure, and receiving the first wireless signal in the present disclosure in the first time-frequency resource block in the first sub-band. Wherein, the first wireless signal carries a first bit block and a second bit block; the first time-frequency resource block comprises a first time-frequency resource sub-block, and whether the first time-frequency resource block comprises the second time-frequency resource sub-block is related to the number of bits included in the first bit block; the second bit block is used to determine the first time-frequency resource block, and the second bit block only occupies the resource elements in the first time-frequency resource sub-block; the first time-frequency resource sub-block and the second time-frequency resource sub-block respectively comprise a positive integer number of resource elements.

In one embodiment, the gNB 410 corresponds to the base station in this disclosure.

In one embodiment, the UE 450 corresponds to the user equipment in this disclosure.

In one embodiment, at least one of {the antenna 452, the receiver 454, the receiving processor 456, the multi-antenna receiving processor 458, the controller/processor 459, the memory 460, the data sources 467} is used to determine the first time-frequency resource block in the present disclosure by itself in the first sub-band in the present disclosure.

In one embodiment, at least one of {the antenna 420, the receiver 418, the receiving processor 470, the multi-antenna receiving processor 472, the controller/processor 475, the memory 476} is used to receive the first wireless signal in the present disclosure in the first time-frequency resource block in the first sub-band in the present disclosure; at least one of {the antenna 452, the transmitter 454, the transmitting processor 468, the multi-antenna transmitting processor 457, the controller/processor 459, the memory 460, the data source 467} is used to transmit the first wireless signal in the present disclosure in the first time-frequency resource block in the first sub-band in this present disclosure.

In one embodiment, at least one of {the antenna 452, the receiver 454, the receiving processor 456, the multi-antenna receiving processor 458, and the controller/processor 459} is used to perform the first channel access detection in the present disclosure in the first sub-band in the present disclosure.

In one embodiment, at least one of {the antenna 452, the receiver 454, the receiving processor 456, the multi-antenna receiving processor 458, the controller/processor 459, the memory 460, the data sources 467} is used to receive the first information in the present disclosure; at least one of {the antenna 420, the transmitter 418, the transmitting processor 416, the multi-antenna transmitting processor 471, the controller/processor 475, the memory 476} is used to transmit the first information in the present disclosure.

In one embodiment, at least one of {the antenna 452, the receiver 454, the receiving processor 456, the multi-antenna receiving processor 458, the controller/processor 459} is used determined the first time window by itself in the M time windows in the present disclosure.

In one embodiment, at least one of {the antenna 452, the receiver 454, the receiving processor 456, the multi-antenna receiving processor 458, the controller/processor 459, the memory 460, the data sources 467} is used to receive the first signaling in the present disclosure; at least one of {the antenna 420, the transmitter 418, the transmitting processor 416, the multi-antenna transmitting processor 471, the controller/processor 475, the memory 476} is used to transmit the first signaling in the present disclosure.

In one embodiment, at least one of {the antenna 452, the receiver 454, the receiving processor 456, the multi-antenna receiving processor 458, the controller/processor 459, the memory 460, the data sources 467} is used to receive the second signaling in the present disclosure; at least one of {the antenna 420, the transmitter 418, the transmitting processor 416, the multi-antenna transmitting processor 471, the controller/processor 475, the memory 476} is used to transmit the second signaling in the present disclosure.

In one embodiment, at least one of {the antenna 420, the receiver 418, the receiving processor 470, the multi-antenna receiving processor 472, the controller/processor 475, the memory 476} is used to determine whether a first time-frequency resource block in the first sub-band in the present disclosure comprises the second time-frequency resource sub-block in the present disclosure.

In one embodiment, at least one of {the antenna 420, the receiver 418, the receiving processor 470, the multi-antenna receiving processor 472, the controller/processor 475, and the memory 476} is used to monitor the first wireless signal in the present disclosure in the M time windows in the present disclosure.

Embodiment V

Figure 5:
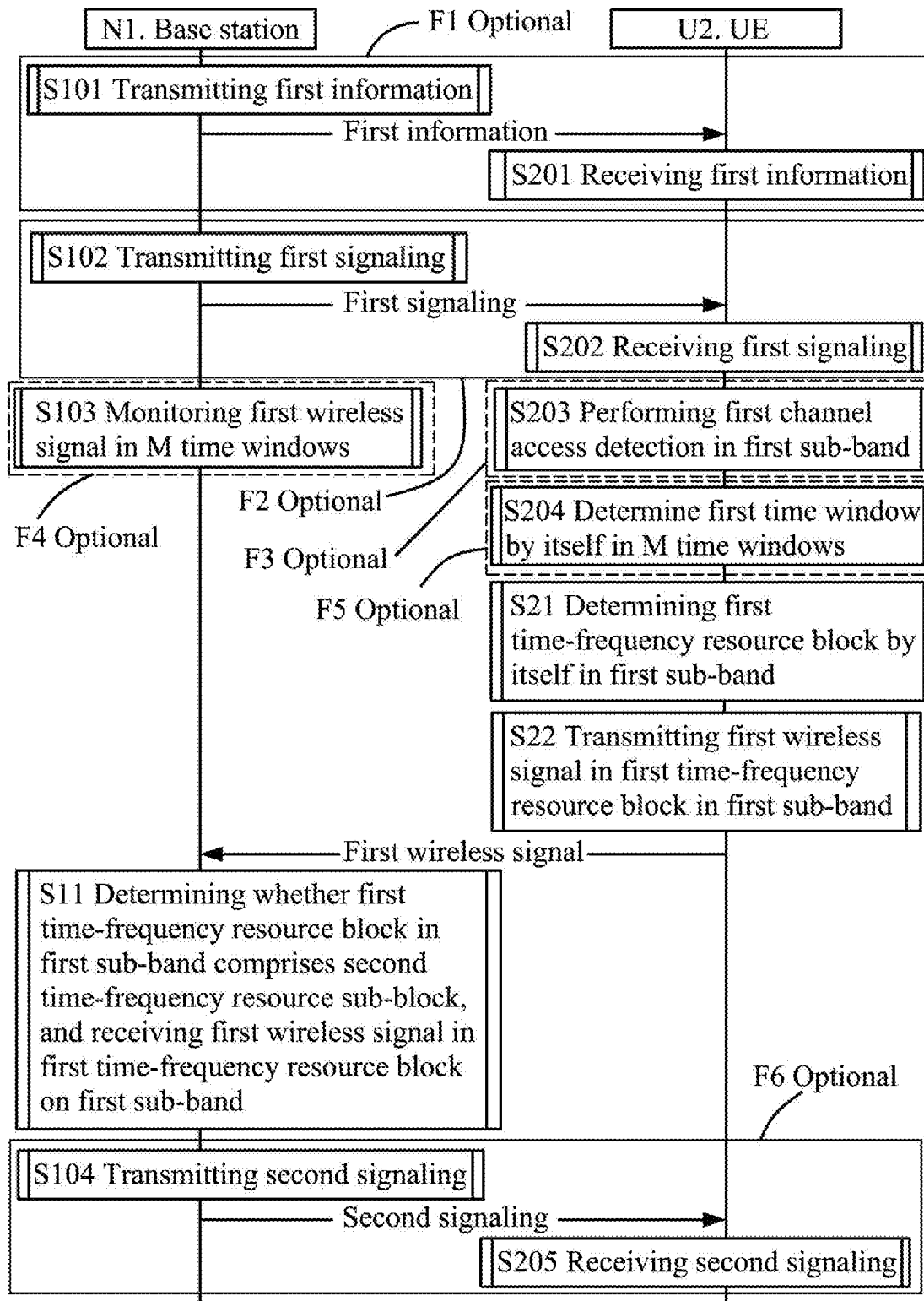
FIG. 5 shows a flow chart of a wireless transmission according to one embodiment of the present disclosure.

Embodiment V illustrates a flow chart of a wireless transmission, as shown in FIG. 5. In FIG. 5, the base station N1 is a maintenance base station of the serving cell of the user equipment U2. In the figure, the steps in the box F1 to box F6 are optional, respectively.

For N1, in step S101, transmitting first information; in step S102, transmitting a first signaling; in step S103, monitoring a first wireless signal in M time windows, in step S11, determining whether a first time-frequency resource block on a first sub-band comprises a second time-frequency resource sub-block, and receiving the first wireless signal in the first time-frequency resource block in the first sub-band; in step S104, transmitting a second signaling.

For U2, in step S201, receiving first information; in step S202, receiving a first signaling; in step S203, performing first channel access detection on a first sub-band; in step S204, determining a first time window by itself in M time windows; in step S21, determining a first time-frequency resource block by itself on the first sub-band; in step S22, transmitting a first wireless signal in the first time-frequency resource block in the first sub-band; in step S205, receiving a second signaling.

In Embodiment V, the first wireless signal carries a first bit block and a second bit block; the first time-frequency resource block comprises a first time-frequency resource sub-block, and whether the first time-frequency resource block comprises the second time-frequency resource sub-block is related to the number of bits included in the first bit block; the second bit block is used by the N1 to determine the first time-frequency resource block, the second bit block occupies only the resource elements in the first time-frequency resource sub-block; the first time-frequency resource sub-block and the second time-frequency resource sub-block respectively comprise a positive integer number of resource elements. The first channel access detection is used by the U2 to determine that the first wireless signal can be transmitted in the first time-frequency resource block in the first sub-band. The first information is used by the U2 to determine the M time windows, and the time domain resource occupied by the first time-frequency resource block belongs to one of the M time windows; the M is a positive integer greater than 1. The N1 successfully detects the first wireless signal in the first time window. The time domain resource occupied by the first time-frequency resource block belongs to the first time window. The first signaling is used to determine at least the former one of the first time-frequency resource sub-block and the second time-frequency resource sub-block. The second signaling indicates whether the first bit block is correctly received.

In one embodiment, the second bit block is used to determine whether the first time-frequency resource block comprises the second time-frequency resource sub-block.

In one embodiment, the second bit block is used by the N1 to determine whether the first time-frequency resource block comprises the second time-frequency resource sub-block.

In one embodiment, the first channel access detection is used by the U2 to determine whether the first sub-band can be used to transmit a wireless signal.

In one embodiment, the first channel access detection is used by the U2 to determine whether the first sub-band is idle (Idle).

In one embodiment, the first channel access detection is used by the U2 to determine that the first sub-band can be used to transmit a wireless signal within the first time window.

In one embodiment, the first channel access detection is used by the U2 to determine that the first sub-band is idle (Idle) within the first time window.

In one embodiment, the monitored behavior is used to determine the first time window from the M time windows.

In one embodiment, the monitoring action is used by the N1 to determine the first time window from the M time windows.

In one embodiment, the monitoring action is used to determine that the first wireless signal was successfully detected in the first time window.

In one embodiment, the monitoring action is used by the N1 to determine that the first wireless signal was successfully detected in the first time window.

In one embodiment, the base station in the present disclosure monitors the first wireless signal via blind detection, that is, receiving a signal and performing a decoding operation, and if the decoding is determined correct according to CRC (Cyclic Redundancy Check) bits, it is determined that the first wireless signal has been successfully detected; otherwise, it is determined that the first wireless signal has not been successfully detected.

In one embodiment, the base station in the present disclosure monitors the first wireless signal via coherent detection, that is, coherent reception by using the RS sequence of the DMRS of the physical layer channel where the first wireless signal is located, and the energy of the signal obtained after the coherent reception is measured. If the energy of the signal obtained after the coherent reception is greater than a first given threshold, it is determined that the first wireless signal is successfully detected; otherwise, it is determined that the first wireless signal is not successfully detected.

In one embodiment, the base station in the present disclosure monitors the first wireless signal via energy detection, that is, sensing the energy of the wireless signal and averaging in time to obtain received energy. If the received energy is greater than a second given threshold, it is determined that the first wireless signal is successfully detected; otherwise, it is determined that the first wireless signal is not successfully detected.

In one embodiment, if the number of bits included in the first bit block is greater than a first threshold, the first time-frequency resource block comprises the second time-frequency resource sub-block; otherwise the first time-frequency resource block does not comprise the second time-frequency resource sub-block; the first threshold is a positive integer.

In one embodiment, the first time-frequency resource block comprises the second time-frequency resource sub-block; the first wireless signal comprises a first sub-signal and a second sub-signal, the first sub-signal and the second sub-signal respectively occupy the resource elements in the first time-frequency resource sub-block and the resource elements in the second time-frequency resource sub-block; the transmitting power of the first sub-signal and the transmitting power of the second sub-signal are not equal.

In one embodiment, the first sub-signal does not occupy the resource elements in the second time-frequency resource sub-block, and the second sub-signal does not occupy the resource elements in the first time-frequency resource sub-block.

In one embodiment, the first wireless signal is comprised of the first sub-signal and the second sub-signal.

In one embodiment, the first sub-signal and the second sub-signal correspond to different modulation and coding schemes.

In one embodiment, the modulation and coding scheme is MCS (Modulation and Coding Scheme).

In one embodiment, the modulation and coding schemes corresponding to the first sub-signal and the second sub-signal are respectively configured by physical layer signaling.

In one embodiment, the modulation and coding schemes corresponding to the first sub-signal and the second sub-signal are respectively configured by dynamic signaling.

In one embodiment, the modulation and coding schemes corresponding to the first sub-signal and the second sub-signal are respectively configured by DCI (Downlink Control Information) identified by SPS (Semi-Persistent Scheduling)-C (Cell)-RNTI (Radio Network Temporary Identifier).

In an embodiment, the scheduling information of the first wireless signal comprises a first multiple access signatures, and the first multiple access signature is only used to generate the second sub-signal of the first sub-signal and the second sub-signal.

In one embodiment, the first multiple access signature is an MA (Multiple Access) signature.

In an embodiment, the scheduling information of the first wireless signal does not include multiple access signatures other than the first multiple access signature.

In one embodiment, a multiple access signature includes one or more of {sequence, codebook, codeword, interleaving pattern, mapping pattern, demodulation reference signal, preamble, spatial-dimension, Power-dimension}.

In one embodiment, the scheduling information of the first wireless signal includes at least one of {occupied time domain resources, occupied frequency domain resources, MCS (Modulation and Coding Scheme), configuration information of DMRS (DeModulation Reference Signals), HARQ (Hybrid Automatic Repeat reQuest) process number, RV (Redundancy Version), NDI (New Data Indicator), corresponding spatial transmitting parameters (Spatial Tx parameters), corresponding spatial receiving parameters (Spatial Rx parameters), the first multiple access signature}.

In one embodiment, the first multiple access signature is configured by physical layer signaling.

In one embodiment, the first multiple access signature is configured by dynamic signaling.

In one embodiment, the first multiple access signature is configured by DCI identified by the SPS-C-RNTI.

In one embodiment, the first multiple access signature is configured by higher layer signaling.

In one embodiment, the first multiple access signature is configured by RRC signaling.

In one embodiment, the first multiple access signature is configured by MAC CE (Medium Access Control Layer Control Element) signaling.

In one embodiment, the first information is carried by higher layer signaling.

In one embodiment, the first information is carried by RRC signaling.

In one embodiment, the first information is an IE (Information Element).

In one embodiment, the first information includes some or all of the fields in an SPS-Config IE.

In one embodiment, the first information is an SPS-Config IE.

In one embodiment, the first information is transmitted in the first sub-band.

In one embodiment, the first information is transmitted in a frequency band other than the first sub-band.

In one embodiment, the first information is transmitted in a frequency band deployed in the unlicensed spectrum.

In one embodiment, the first information is transmitted in a frequency band deployed in the licensed spectrum.

In one embodiment, the first information indicates the M time windows.

In one embodiment, the first information explicitly indicates the M time windows.

In one embodiment, the first information includes a first bit string, the first bit string includes a positive integer number of bits, and the first bit string indicates the M time windows.

In a sub-embodiment of the above embodiment, the first bit string includes 40 bits.

In a sub-embodiment of the above embodiment, the M time windows are a subset of N time windows, and the N is a positive integer not less than the M. The first bit string includes N bits, and the N bits are in one-to-one correspondence with the N time windows. For any given bit in the first bit string, if the any given bit is equal to a first bit value, a time window corresponding to the any given bit in the N time windows is one of the M time windows; if the any given bit is not equal to the first bit value, a time window corresponding to the any given bit in the N time windows is not one of the M time windows.

In a reference embodiment of the above sub-embodiment, the first bit value is equal to one.

In a reference embodiment of the above sub-embodiment, the first bit value is equal to zero.

In one embodiment, the first signaling indicates at least the former one of a frequency resource occupied by the first time-frequency resource sub-block and a frequency resource occupied by the second time-frequency resource sub-block.

In one embodiment, the first signaling indicates a frequency resource occupied by the first time-frequency resource sub-block and a frequency resource occupied by the second time-frequency resource sub-block.

In one embodiment, the first signaling only indicates a frequency resource occupied by the first time-frequency resource sub-block of the first time-frequency resource sub-block and the second time-frequency resource sub-block.

In one embodiment, the first signaling only indicates a frequency resource occupied by the first time-frequency resource sub-block of the first time-frequency resource sub-block and the second time-frequency resource sub-block, a third signaling indicates a frequency resource occupied by the second time-frequency resource sub-block.

In a sub-embodiment of the above embodiment, the third signaling is physical layer signaling.

in a sub-embodiment of the above embodiment, the third signaling is UE-specific.

In a sub-embodiment of the above embodiment, the third signaling is terminal group specific, the terminal group includes a positive integer number of terminals, and the U2 is one terminal in the terminal group.

In a sub-embodiment of the above embodiment, the third signaling is cell-common.

In one embodiment, the first signaling is physical layer signaling.

In one embodiment, the first signaling is dynamic signaling.

In one embodiment, the first signaling includes DCI.

In one embodiment, the first signaling is UE specific.

In one embodiment, the signaling identifier of the first signaling is SPS-C-RNTI.

In one embodiment, the first signaling is DCI identified by SPS-C-RNTI.

In one embodiment, the payload size of the first signaling is equal to a payload size of DCI Format 0A (DCI format 0A) or a payload size of DCI Format 4A (DCI format 4A).

In a sub-embodiment of the above embodiment, the specific definitions of DCI Format 0A and DCI Format 4A are described in section 5.3 of 3GPP TS 36.212.

In one embodiment, the first signaling is used for AUL activation.

In one embodiment, the first signaling is used to activate the M time windows.

In one embodiment, the first signaling is transmitted in the first sub-band.

In one embodiment, the first signaling is transmitted in a frequency band other than the first sub-band.

In one embodiment, the first signaling is transmitted in a frequency band deployed in the unlicensed spectrum.

In one embodiment, the first signaling is transmitted in a frequency band deployed in the licensed spectrum.

In one embodiment, the first information and the first signaling are used together to determine M time-frequency resource sets, the M time-frequency resource sets respectively occupy the M time windows in the time domain. The M time-frequency resource sets occupy the same frequency resource in the frequency domain. The first time-frequency resource sub-block belongs to one of the M time-frequency resource sets.

In a sub-embodiment of the above embodiment, the second time-frequency resource sub-block and the first time-frequency resource sub-block belong to a same time-frequency resource set in the M time-frequency resource sets.

In one embodiment, the second signaling is physical layer signaling.

In one embodiment, the second signaling is dynamic signaling.

In one embodiment, the second signaling includes DCI.

In one embodiment, the second signaling is UE specific.

In one embodiment, the signaling identifier of the second signaling is SPS-C-RNTI.

In one embodiment, the second signaling is DCI identified by SPS-C-RNTI.

In one embodiment, the second signaling and the first signaling have the same signaling identifier.

In one embodiment, the payload size of the second signaling is equal to a payload size of DCI Format 0A (DCI format 0A) or a payload size of DCI Format 4A (DCI format 4A).

In a sub-embodiment of the above embodiment, the specific definitions of DCI Format 0A and DCI Format 4A are described in section 5.3 of 3GPP TS 36.212.

In one embodiment, the second signaling is transmitted in the first sub-band.

In one embodiment, the second signaling is transmitted in a frequency band other than the first sub-band.

In one embodiment, the second signaling is transmitted in a frequency band deployed in the unlicensed spectrum.

In one embodiment, the second signaling is transmitted in a frequency band deployed in the licensed spectrum.

In one embodiment, the first wireless signal is transmitted on an uplink physical layer data channel (i.e., an uplink channel that can be used to carry physical layer data).

In a sub-embodiment of the above embodiment, the uplink physical layer data channel is a PUSCH (Physical Uplink Shared CHannel).

In a sub-embodiment of the above embodiment, the uplink physical layer data channel is a sPUSCH (short PUSCH).

In a sub-embodiment of the above embodiment, the uplink physical layer data channel is a NR-PUSCH (New Radio PUSCH).

In a sub-embodiment of the above embodiment, the uplink physical layer data channel is a NB-PUSCH (Narrow Band PUSCH).

In one embodiment, a transmission channel corresponding to the first wireless signal is a UL-SCH (Uplink Shared Channel).

In one embodiment, the first information is transmitted on a downlink physical layer data channel (i.e., a downlink channel that can be used to carry physical layer data).

In a sub-embodiment of the above embodiment, the downlink physical layer data channel is a PDSCH (Physical Downlink Shared CHannel).

In sub-embodiment of the above embodiment, the downlink physical layer data channel is a sPDSCH (short PDSCH).

In a sub-embodiment of the above embodiment, the downlink physical layer data channel is a NR-PDSCH (New Radio PDSCH).

In a sub-embodiment of the above embodiment, the downlink physical layer data channel is a NB-PDSCH (Narrow Band PDSCH).

In one embodiment, the first signaling is transmitted on a downlink physical layer control channel (i.e., a downlink channel that can only be used to carry physical layer signaling).

In a sub-embodiment of the above embodiment, the downlink physical layer control channel is a PDCCH (Physical Downlink Control CHannel).

In a sub-embodiment of the above embodiment, the downlink physical layer control channel is a sPDCCH (short PDCCH).

In a sub-embodiment of the above embodiment, the downlink physical layer control channel is a NR-PDCCH (New Radio PDCCH).

In a sub-embodiment of the above embodiment, the downlink physical layer control channel is a NB-PDCCH (Narrow Band PDCCH).

In one embodiment, the second signaling is transmitted on a downlink physical layer control channel (i.e., a downlink channel that can only be used to carry physical layer signaling).

In a sub-embodiment of the above embodiment, the downlink physical layer control channel is a PDCCH.

In a sub-embodiment of the above embodiment, the downlink physical layer control channel is a sPDCCH.

In a sub-embodiment of the above embodiment, the downlink physical layer control channel is a NR-PDCCH.

In a sub-embodiment of the above embodiment, the downlink physical layer control channel is a NB-PDCCH.

Embodiment VI

Figure 6:
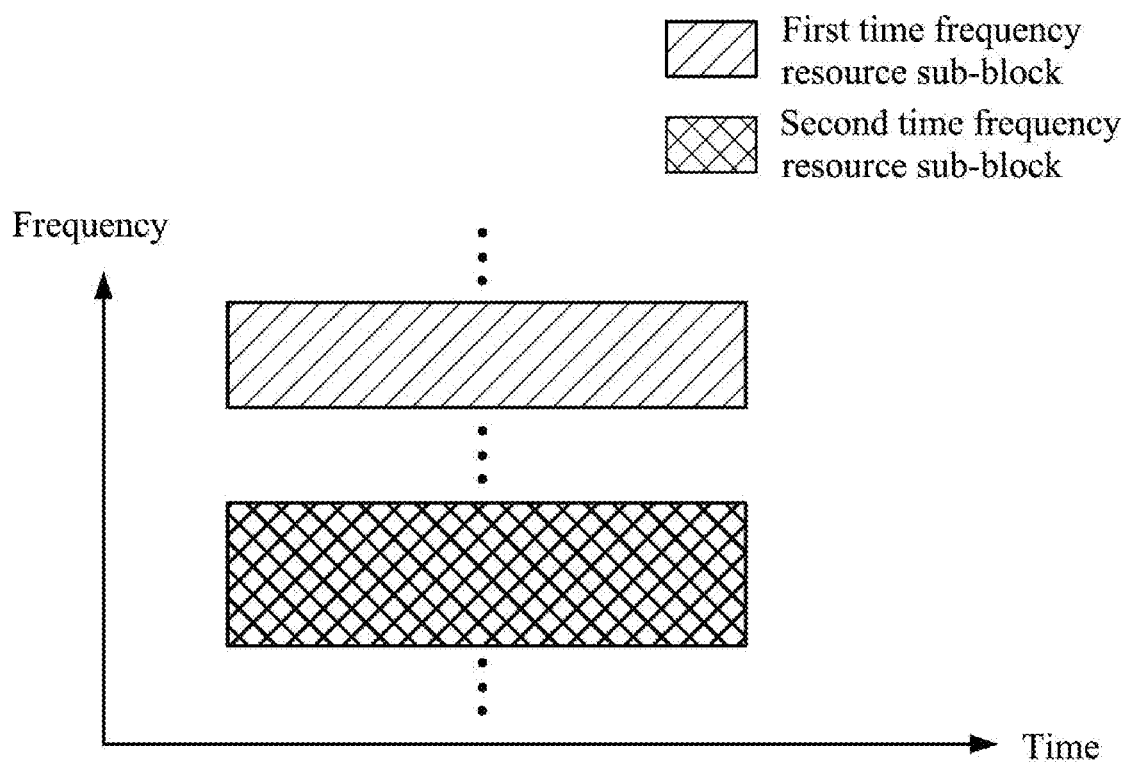
FIG. 6 shows a schematic diagram of resource mapping of a first time-frequency resource sub-block and a second time-frequency resource sub-block on a time-frequency domain according to one embodiment of the present disclosure.

Embodiment VI illustrates a schematic diagram of a resource mapping of a first time-frequency resource sub-block and a second time-frequency resource sub-block on a time-frequency domain, as shown in FIG. 6.

In Embodiment VI, the first time-frequency resource sub-block and the second time-frequency resource sub-block respectively comprise a positive integer number of resource elements. The first time-frequency resource sub-block and the second time-frequency resource sub-block occupy the same time domain resource and mutually orthogonal frequency resources. In FIG. 6, a left-slash-filled box represents the first time-frequency resource sub-block, and a cross-line-filled box represents the second time-frequency resource sub-block.

In one embodiment, the first time-frequency resource sub-block occupies a positive integer number of multi-carrier symbol(s) in the time domain.

In one embodiment, the first time-frequency resource sub-block occupies a positive integer number of consecutive multi-carrier symbol(s) in the time domain.

In one embodiment, the first time-frequency resource sub-block occupies a positive integer number of sub-carriers in the frequency domain.

In one embodiment, the first time-frequency resource sub-block occupies a positive integer number of PRB(s) (Physical Resource Block) in the frequency domain.

In one embodiment, the first time-frequency resource sub-block occupies a positive integer number of consecutive PRB(s) in the frequency domain.

In one embodiment, the first time-frequency resource sub-block occupies a positive integer number of RB(s) (Resource Block) in the frequency domain.

In one embodiment, the first time-frequency resource sub-block occupies a positive integer number of consecutive RB(s) in the frequency domain.

In one embodiment, the second time-frequency resource sub-block occupies a positive integer number of multi-carrier symbol(s) in the time domain.

In one embodiment, the second time-frequency resource sub-block occupies a positive integer number of consecutive multi-carrier symbol(s) in the time domain.

In one embodiment, the second time-frequency resource sub-block occupies a positive integer number of sub-carriers in the frequency domain.

In one embodiment, the second time-frequency resource sub-block occupies a positive integer number of PRB(s) in the frequency domain.

In one embodiment, the second time-frequency resource sub-block occupies a positive integer number of consecutive PRB(s) in the frequency domain.

In one embodiment, the second time-frequency resource sub-block occupies a positive integer number of RB(s) in the frequency domain.

In one embodiment, the second time-frequency resource sub-block occupies a positive integer number of consecutive RB(s) in the frequency domain.

In one embodiment, the first time-frequency resource sub-block and the second time-frequency resource sub-block occupy the same time domain resource.

In one embodiment, the time domain resources occupied by the first time-frequency resource sub-block and the second time-frequency resource sub-block are completely overlapping.

In one embodiment, the first time-frequency resource sub-block and the second time-frequency resource sub-block occupy mutually orthogonal frequency resources.

In one embodiment, if the number of bits included in the first bit block in the present disclosure is greater than a first threshold, the first time-frequency resource block in the present disclosure is composed of the first time-frequency resource sub-block and the second time-frequency resource sub-block; otherwise, the first time-frequency resource block is only composed of the first time-frequency resource sub-block of the first time-frequency resource sub-block and the second time-frequency resource sub-block; the first threshold is a positive integer.

Embodiment VII

Figure 7:
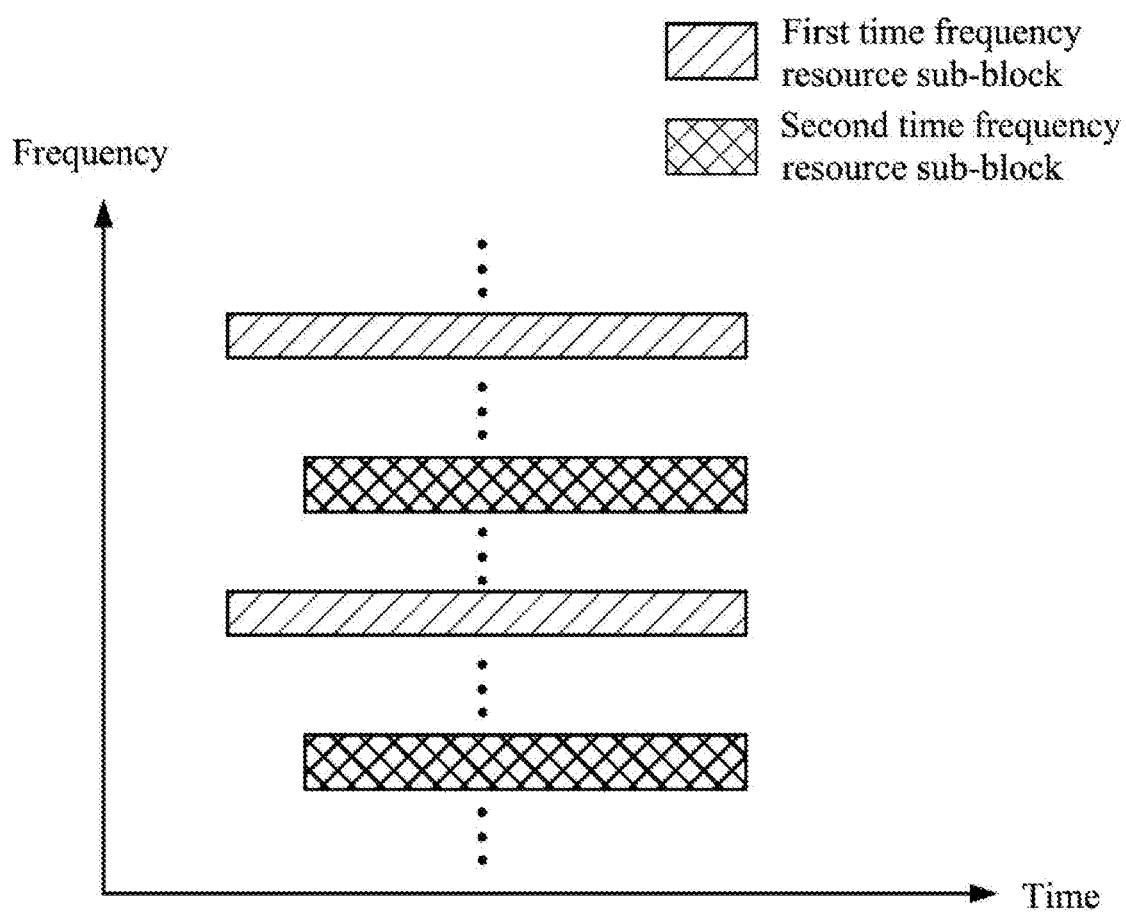
FIG. 7 shows a schematic diagram of resource mapping of a first time-frequency resource sub-block and a second time-frequency resource sub-block on a time-frequency domain according to one embodiment of the present disclosure.

Embodiment VII illustrates a schematic diagram of resource mapping of a first time-frequency resource sub-block and a second time-frequency resource sub-block on a time-frequency domain, as shown in FIG. 7.

In Embodiment VII, the first time-frequency resource sub-block and the second time-frequency resource sub-block respectively comprise a positive integer number of resource elements. In FIG. 7, left-slash-filled boxes represent the first time-frequency resource sub-block, and cross-line-filled boxes represent the second time-frequency resource sub-block.

In one embodiment, the first time-frequency resource sub-block occupies a positive integer number of discontinuous PRB(s) in the frequency domain.

In one embodiment, the first time-frequency resource sub-block occupies a positive integer number of discontinuous RB(s) in the frequency domain.

In one embodiment, the second time-frequency resource sub-block occupies a positive integer number of discontinuous PRB(s) in the frequency domain.

In one embodiment, the second time-frequency resource sub-block occupies a positive integer number of discontinuous RB(s) in the frequency domain.

In one embodiment, the time domain resources occupied by the first time-frequency resource sub-block and the second time-frequency resource sub-block partially overlap.

Embodiment VIII

Figure 8:
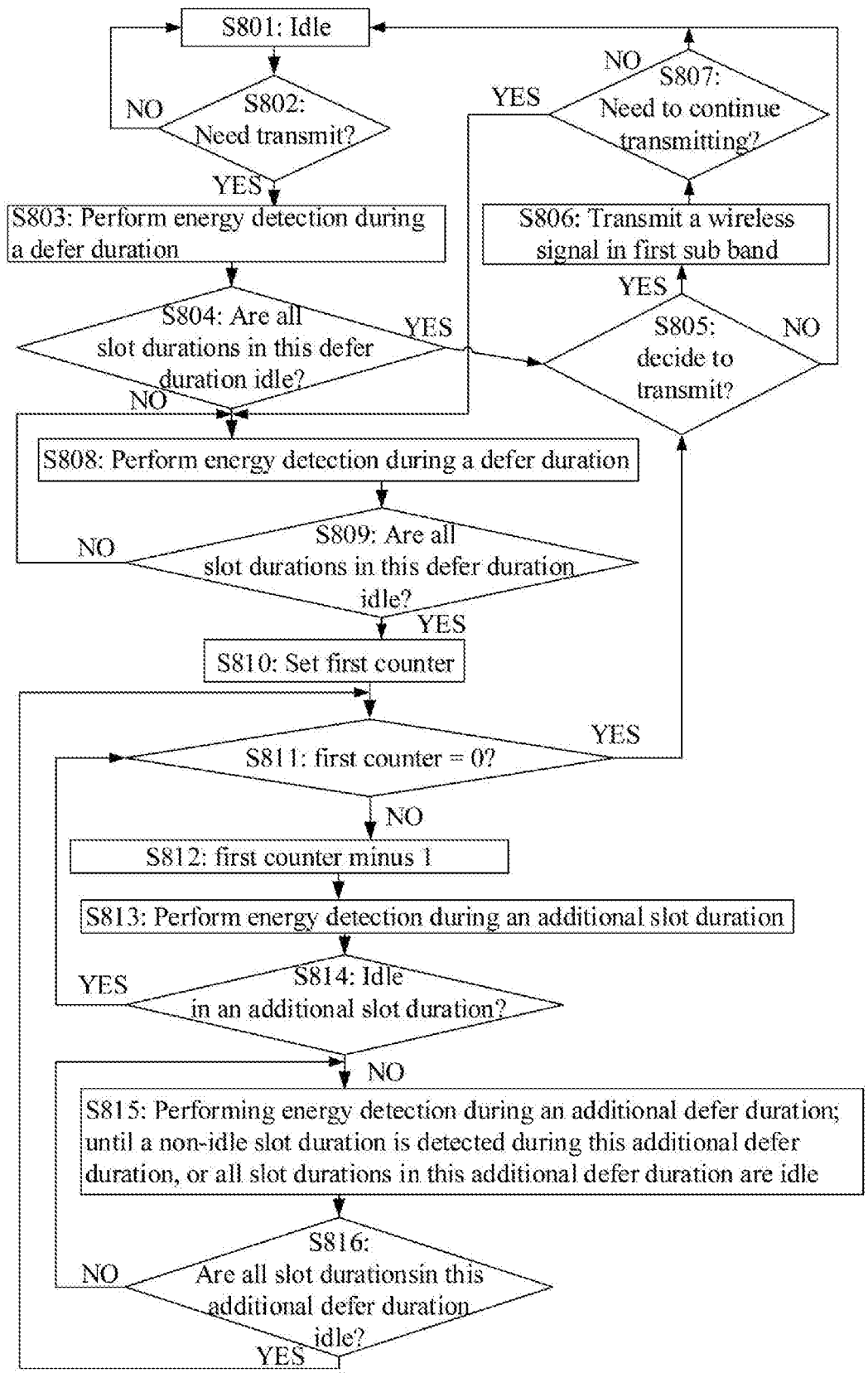
FIG. 8 shows a flow chart of first channel access detection according to one embodiment of the present disclosure.

Embodiment VIII illustrates a flow chart of first channel access detection, as shown in FIG. 8.

In Embodiment VIII, the process of the first channel access detection may be described by the flowchart in FIG. 8. The user equipment in this disclosure is an idle state in step S80; determines whether it is necessary to transmit in step S802; if yes, proceeds to step S803, otherwise returns to step S801; performs energy detection in a defer duration in the first sub-band in this disclosure in step S803; determines whether all slot durations in the defer duration are idle in step S804; if yes, proceeds to step S805, otherwise, proceeds to step S808; determines whether to transmit in step S805; if yes, proceeds to step S806, otherwise returning to step S801; transmits a wireless signal in the first sub-band in step S806; determines whether to continue transmitting in step S807, if yes, proceeds to step S808, otherwise returns to step S801; performs energy detection in a defer duration in the first sub-band in step 808; determines whether all slot durations in the defer duration are idle in step S809; if yes, proceeds to step S810, otherwise returns to step S808; sets a first counter in step S810; determines whether the first counter is 0 in step S811; if yes, returns to step S805, otherwise proceeds to step S812; decrease the first counter by 1 in step S812; performs energy detection in an additional slot duration in the first sub-band in step S813; determines whether the additional slot duration is idle in step S814; if so, returns to step S811, otherwise proceeds to step S815; performs energy detection in an additional delay duration in the first sub-band in step S815 until a non-idle slot duration is detected in this additional defer duration, or all slot durations in this additional defer duration are idle; determines whether all slot durations in this additional defer duration are idle in step S816; if yes, returns to step S811, otherwise returns to step S815.

In one embodiment, the specific definitions of the defer duration, the slot duration, the additional slot duration and the additional defer duration in FIG. 8 can be found in section 15 of 3GPP TS 36.213.

In one embodiment, the first channel access detection is used to determine whether the first sub-band can be used to transmit a wireless signal.

In one embodiment, the first channel access detection is used to determine whether the first sub-band is idle.

In one embodiment, the first channel access detection is used to determine that the first sub-band can be used to transmit a wireless signal in the first time window in the present disclosure.

In one embodiment, the first channel access detection is used to determine that the first sub-band is idle in the first time window in the present disclosure.

In one embodiment, the first channel access detection is LBT (Listen Before Talk).

In a sub-embodiment of the above embodiment, the specific definition and implementation manner of the LBT is referred to 3GPP TR36.889.

In one embodiment, the first channel access detection is Category 4 LBT (a fourth type of LBT).

In a sub-embodiment of the above embodiment, the specific definition and implementation manner of the Category 4 LBT is referred to 3GPP TR36.889.

In one embodiment, the first channel access detection is CCA (Clear Channel Assessment).

In a sub-embodiment of the above embodiment, the specific definition and implementation manner of CCA is referred to 3GPP TR36.889.

In one embodiment, the first channel access detection is channel access procedure for uplink transmission.

In a sub-embodiment of the above embodiment, a specific definition and implementation manner of channel access procedure for uplink transmission is referred to section 15.2 of 3GPP TS 36.213.

In one embodiment, the first channel access detection is Type 1 UL channel access procedure.

In a sub-embodiment of the above embodiment, a specific definition and implementation manner of Type 1 UL channel access procedure is referred to section 15.2 of 3GPP TS 36.213.

In one embodiment, the first channel access detection is implemented in a manner defined in section 15 of 3GPP TS 36.213.

In one embodiment, the user equipment performs energy detection in a given time period via energy detection in all slot durations in the given time period; the given time period is any one duration of {all defer duration in step S803 and step S808, all additional slot duration in step S813, and all additional defer duration in step S815} in FIG. 8.

In one embodiment, the user equipment performs energy detection in a given slot duration via sensing the power of wireless signals in a given time unit and averaging in time to obtain received power; the given time unit is a continuous period of time in the given slot duration.

In one embodiment, the user equipment performs energy detection in a slot duration via sensing the energy of wireless signals in a given time unit and averaging in time to obtain received energy; the given time unit is a continuous period of time in the slot duration.

In one embodiment, the phrase that a slot duration is idle refers to sensing the power of wireless signals in a given time unit and averaging in time to obtain received power that is lower than a reference threshold; the given time unit is a continuous period of time in the slot duration.

In one embodiment, the phrase that a slot duration is idle refers to sensing the energy of wireless signals in a given time unit and averaging in time to obtain received energy that is lower than a reference threshold; the given time unit is a continuous period of time in the slot duration.

In one embodiment, the given time unit is no shorter than 4 microseconds.

In one embodiment, a defer duration is 16 microseconds plus K1 9 microseconds, the K1 is a positive integer.

In a sub-embodiment of the above embodiment, the K1 belongs to {1, 2, 3, and 7}.

In one embodiment, a defer duration includes a plurality of slot durations.

In a sub-embodiment of the above embodiment, the first slot duration and the second slot duration in the plurality of slot durations are discontinuous.

In a sub-embodiment of the above embodiment, the time interval between the first slot duration and the second slot duration in the plurality of slot durations is 7 milliseconds.

In one embodiment, one defer duration is equal to one additional defer duration.

In one embodiment, one slot duration is 9 microseconds.

In one embodiment, one additional slot duration is equal to one slot duration.

In one embodiment, the first counter in step S808 is set to one of K candidate integers.

In one embodiment, the K belongs to {3, 7, 15, 31, 63, 127, 255, 511, and 1023}.

In one embodiment, the K is the $CW_p$ in Category 4 LBT, and the $CW_p$ is the size of a contention window, the specific definition of the $CW_p$ is refer to the section 15 in 3GPP TS 36.213.

In one embodiment, the K candidate integers are 0, 1, 2, . . . , K−1.

In one embodiment, the user equipment randomly selects one candidate integer among the K candidate integers and set the value of the first counter as the selected one candidate integer.

In one embodiment, the probability that any of the K candidate integers is selected to set the first counter is equal.

Embodiment IX

Figure 9:
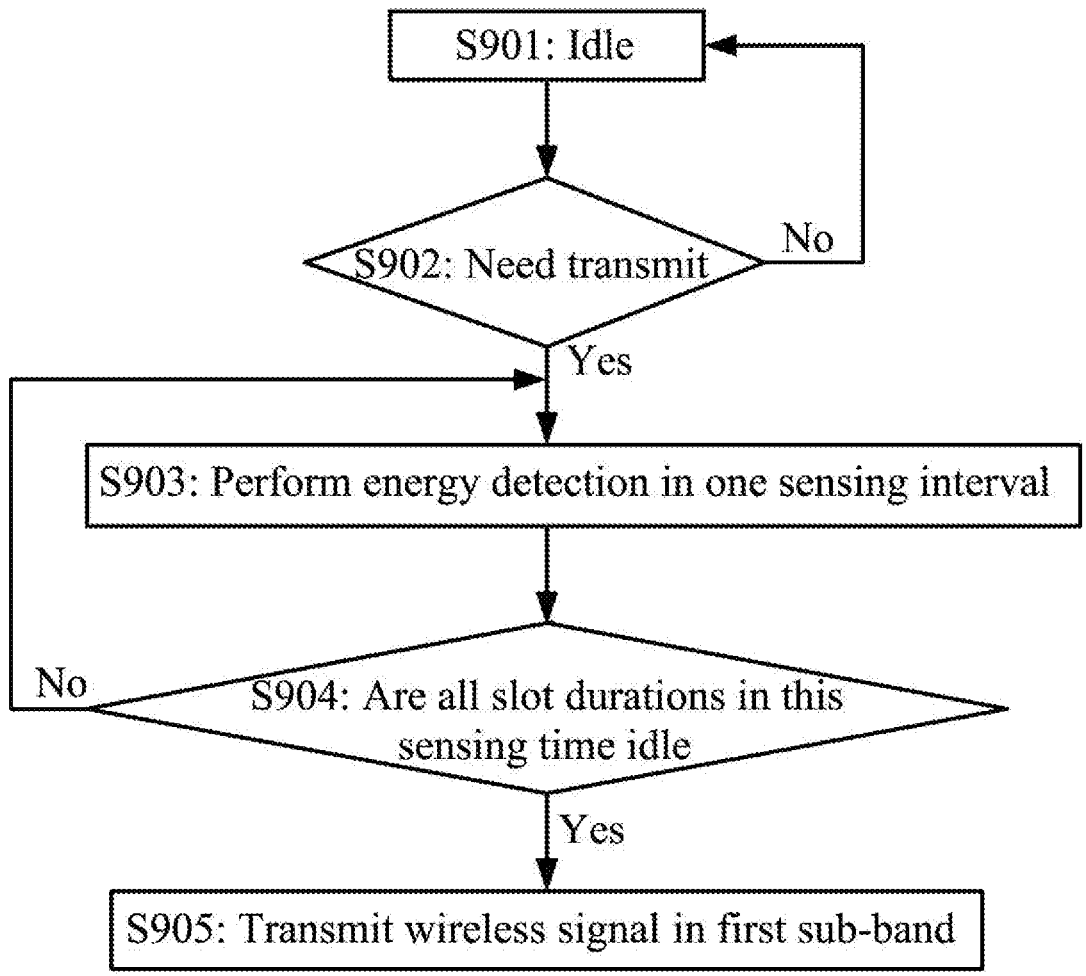
FIG. 9 shows a flow chart of first channel access detection according to one embodiment of the present disclosure.

Embodiment IX illustrates a flow chart of first channel access detection; as shown in FIG. 9.

In Embodiment IX, the process of the first channel access detection may be described by the flowchart in FIG. 9. The user equipment in the present disclosure is in an idle state in step S901; determines whether transmission is required in step S902; if yes, proceeds to step 903, otherwise returns to step S901; performs energy detection in a sensing interval in the first sub-band in the present disclosure in step 903; determines whether all slot durations in the sensing interval are idle in step S904; if yes, proceeds to step S905, otherwise returns to step S903; transmits a wireless signal in the first sub-band in step S905.

In one embodiment, the specific definitions of the sensing interval and slot duration in FIG. 9 are referred to section 15.2 of 3GPP TS 36.213.

In one embodiment, the first channel access detection is a Category 2 LBT.

In a sub-embodiment of the above embodiment, the specific definition and implementation manner of the Category 2 LBT is referred to 3GPP TR36.889.

In one embodiment, the first channel access detection is Type 2 UL channel access procedure.

In a sub-embodiment of the above embodiment, a specific definition and implementation manner of the Type 2 UL channel access procedure is referred to section 15.2 of 3GPP TS 36.213.

In one embodiment, the user equipment performs energy detection in one sensing interval via performing energy detection in all slot durations in the one sensing interval.

In one embodiment, a sensing interval is 25 microseconds.

In one embodiment, one sensing interval includes two slot durations, the two slot durations being discontinuous in the time domain.

In a sub-embodiment of the above embodiment, the time interval in the two slot durations is 7 microseconds.

Embodiment X

Embodiment X illustrates a schematic diagram of information carried by a second bit block, as shown in FIG. 10.

In the embodiment X, the second bit block carries first sub-information, second sub-information, third sub-information, fourth sub-information, fifth sub-information, sixth sub-information, and seventh sub-information. The first sub-information indicates whether the first time-frequency resource block in the present disclosure comprises the second time-frequency resource sub-block in the present disclosure; the second sub-information indicates a HARQ process number corresponding to the first wireless signal in the present disclosure; the third sub-information indicates an RV corresponding to the first wireless signal; the fourth sub-information indicates an NDI corresponding to the first wireless signal; and the fifth sub-information indicates a UE ID (Identity) of the user equipment in the present disclosure; the sixth sub-information indicates an ending time of a time domain resource occupied by the first wireless signal; and the seventh sub-information indicates a COT (Channel Occupy Time) Sharing indication.

In one embodiment, the second bit block carries UCI.

In one embodiment, the second bit block carries AUL-UCI.

In one embodiment, the second bit block indicates whether the first time-frequency resource block comprises the second time-frequency resource sub-block.

In one embodiment, the second bit block carries a first sub-information, and the first sub-information indicates whether the first time-frequency resource block comprises the second time-frequency resource sub-block.

In one embodiment, the second bit block carries a second sub-information, and the second sub-information indicates a HARQ process number corresponding to the first wireless signal.

In one embodiment, the second bit block carries a third sub-information, and the third sub-information indicates an RV corresponding to the first wireless signal.

In one embodiment, the second bit block carries a fourth sub-information, and the fourth sub-information indicates an NDI corresponding to the first wireless signal.

In one embodiment, the second bit block carries a fifth sub-information, and the fifth sub-information indicates a UE ID (Identity) of the user equipment.

In a sub-embodiment of the above embodiment, the UE ID is a C (Cell)-RNTI (Radio Network Temporary Identifier).

In one embodiment, the second bit block carries a sixth sub-information, and the sixth sub-information indicates an ending time of a time domain resource occupied by the first wireless signal.

In one embodiment, the second bit block carries a seventh sub-information, and the seventh sub-information indicates a COT Sharing indication.

Embodiment XI

Figure 11:
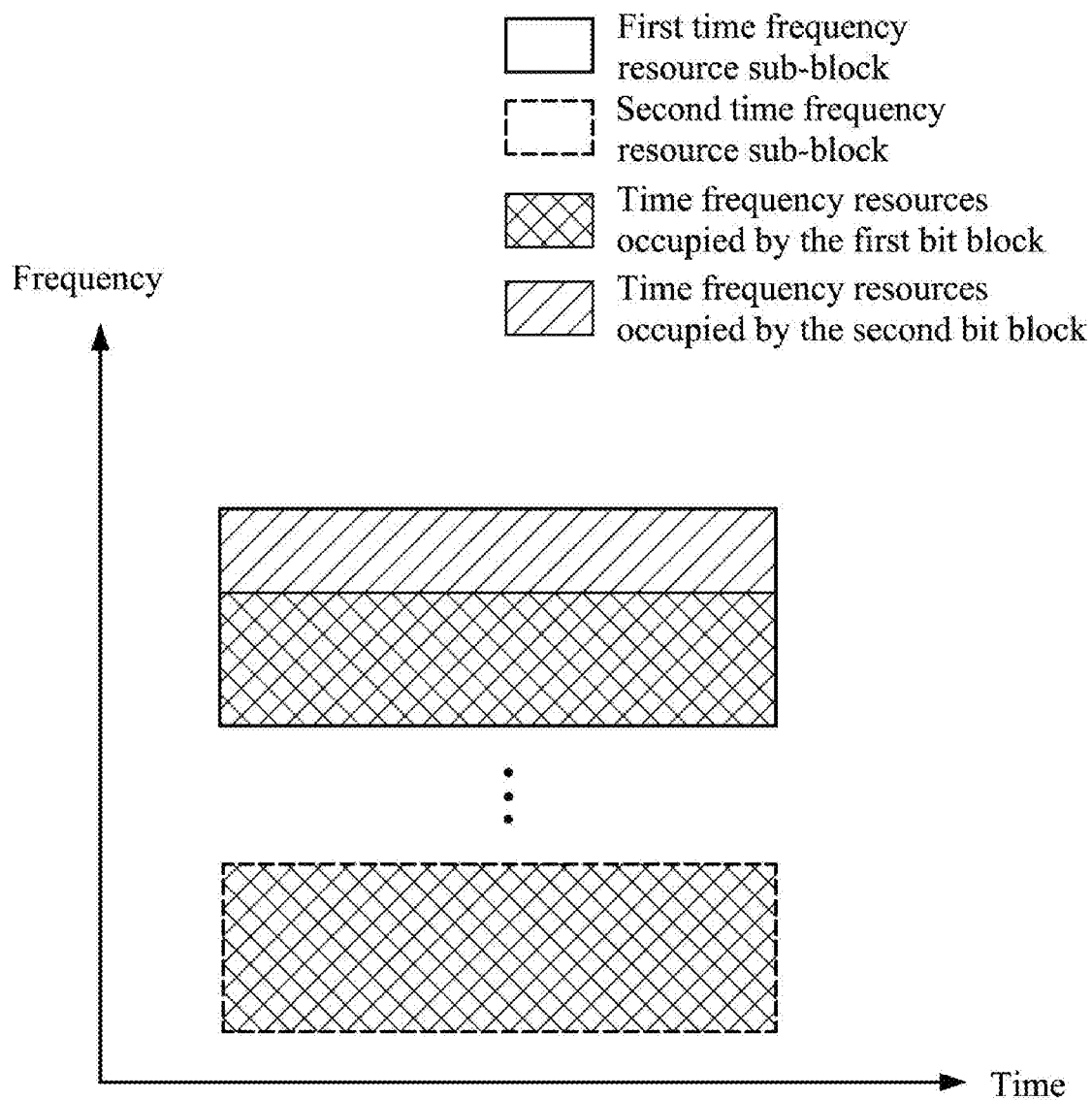
FIG. 11 shows a schematic diagram of resource occupancy of a first bit block and a second bit block in a time-frequency domain according to one embodiment of the present disclosure.

Embodiment XI illustrates a schematic diagram of resource occupancy of a first bit block and a second bit block in a time-frequency domain; as shown in FIG. 11.

In Embodiment XI, the first time-frequency resource block in the present disclosure comprises the first time-frequency resource sub-block in the present disclosure and the second time-frequency resource sub-block in the present disclosure. The first bit block occupies the resource elements in the first time-frequency resource sub-block and the resource elements in the second time-frequency resource sub-block, the second bit block occupies only the resource elements in the first time-frequency resource sub-block of the first time-frequency resource sub-block and the second time-frequency resource sub-block. In FIG. 11, a box of a thick solid border represents the first time-frequency resource sub-block, a box of a thick dashed border represents the second time-frequency resource sub-block, and a cross-line filled box represents the time-frequency resource occupied by the first bit block, and the left-slash filled box represents the time-frequency resource occupied by the second bit block.

In an embodiment, the first time-frequency resource block comprises the second time-frequency resource sub-block, and the first bit block occupies the resource elements in the first time-frequency resource sub-block and the second time-frequency resource sub-block.

In one embodiment, the second bit block does not occupy the resource elements in the second time-frequency resource sub-block.

In one embodiment, the first time-frequency resource block comprises the second time-frequency resource sub-block, and the second bit block occupies only the resource elements in the first time-frequency resource sub-block of the first time-frequency resource sub-block and the second time-frequency resource sub-block.

In one embodiment, the phrase that a given bit block occupies resource elements in the given time-frequency resource block means that, a wireless signal carrying the given bit block occupies resource elements in the given time-frequency resource block; the given bit block is the first bit block or the second bit block, and the given time-frequency resource block is the first time-frequency resource sub-block or the second time-frequency resource sub-block.

Embodiment XII

Figure 12:
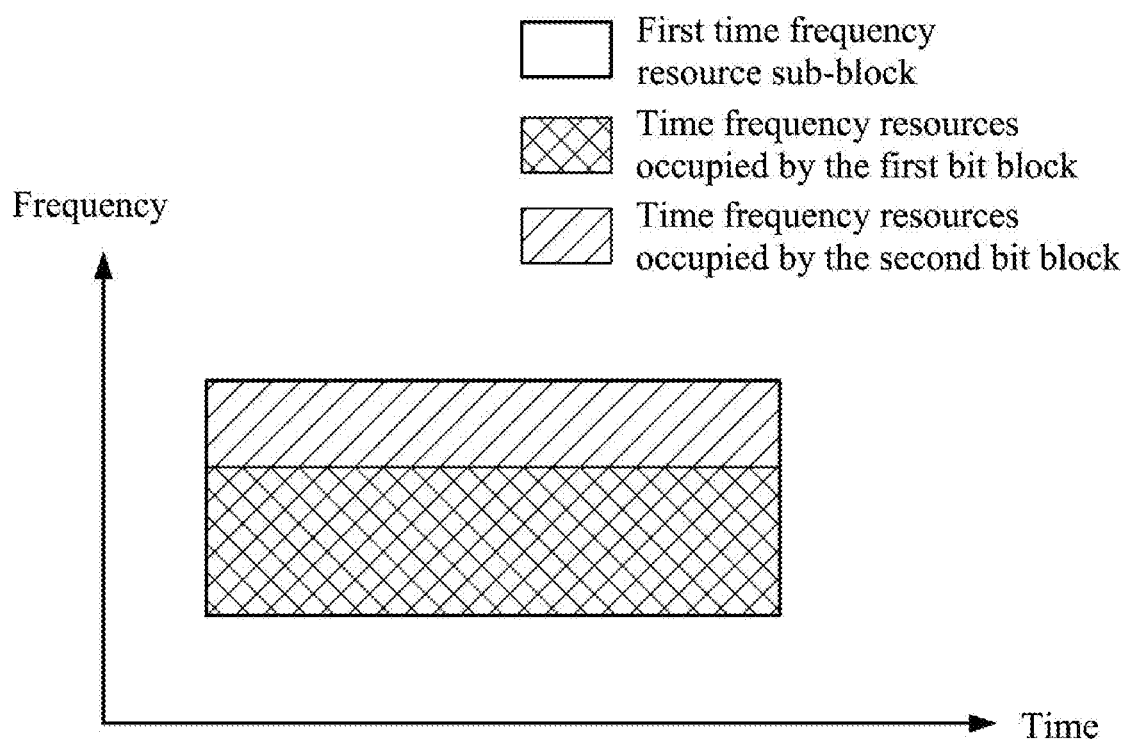
FIG. 12 shows a schematic diagram of resource occupancy of a first bit block and a second bit block in a time-frequency domain according to one embodiment of the present disclosure.

Embodiment XII illustrates a schematic diagram of resource occupancy of a first bit block and a second bit block in a time-frequency domain, as shown in FIG. 12.

In Embodiment XII, the first time-frequency resource block in this present disclosure comprises only the first time-frequency resource sub-block of the first time-frequency resource sub-block and the second time-frequency resource sub-block in this present disclosure. The first bit block and the second bit block respectively occupy the resource elements in the first time-frequency resource sub-block. In FIG. 12, a box with a thick solid border represents the first time-frequency resource sub-block, a box filled with crossed lines represents the time-frequency resource occupied by the first bit block, and a box filled with left-slash represents the time-frequency resource occupied by the second bit block.

In one embodiment, the first time-frequency resource block does not include the second time-frequency resource sub-block, and the first bit block occupies only the resource elements in the first time-frequency resource sub-block of the first time-frequency resource sub-block and the second time-frequency resource.

Embodiment XIII

Embodiment XIII illustrates a schematic diagram of resource mapping and transmission power of the first sub-signal and transmission power of the second sub-signal in the time-frequency domain, as shown in FIG. 13.

In embodiment XIII, the first time-frequency resource block in the present disclosure comprises the first time-frequency resource sub-block in the present disclosure and the second time-frequency resource sub-block in the present disclosure; The first wireless signal in the present disclosure comprises the first sub-signal and the second sub-signal, and the first sub-signal and the second sub-signal respectively occupy the resource elements in the first time-frequency resource sub-block and the resource elements in the second time-frequency resource sub-block. The transmission power of the first sub-signal and the transmission power of the second sub-signal are not equal. The transmission power of the first sub-signal is a minimum of a first power and a first power threshold; and the transmission power of the second sub-signal is a minimum of a second power and a second power threshold. The first power and {a first desired power, a second component, a third component, a fourth component, a the fifth component} are respectively linearly correlated; linear coefficients between the first power and {the first desired power, the second component, the fourth component, and the fifth component} are 1, respectively, and a linear coefficient between the first power and the third component is a first coefficient. The second power and {a second desired power, a sixth component, a seventh component, an eighth component, and a ninth component} are respectively linearly correlated, linear coefficients between the second power and {the second desired power, the sixth component, the eighth component, the ninth component} are 1, respectively, a linear coefficient between the second power and the seventh component is a second coefficient.

In FIG. 13, a left-slash filled box represents the first time-frequency resource sub-block, and a cross-line-filled box represents the second time-frequency resource sub-block.

In one embodiment, the first sub-signal does not occupy the resource elements in the second time-frequency resource sub-block, and the second sub-signal does not occupy the resource elements in the first time-frequency resource sub-block.

In one embodiment, the first sub-signal and the second sub-signal correspond to different modulation and coding schemes.

In one embodiment, the modulation and coding scheme corresponding to the first sub-signal is higher than the modulation and coding scheme corresponding to the second sub-signal.

In one embodiment, the transmission rate of the modulation and coding scheme corresponding to the first sub-signal is higher than the transmission rate of the modulation and coding scheme corresponding to the second sub-signal.

In one embodiment, the unit of the transmission power of the first sub-signal and the transmission power of the second sub-signal are respectively dBm.

In one embodiment, the units of the first power and the second power are respectively dBm.

In one embodiment, the transmission power of the first sub-signal is equal to the first power.

In one embodiment, the transmission power of the first sub-signal is less than the first power.

In one embodiment, the transmission power of the first sub-signal is equal to the first power threshold.

In one embodiment, the transmission power of the second sub-signal is equal to the second power.

In one embodiment, the transmission power of the second sub-signal is less than the second power.

In one embodiment, the transmission power of the second sub-signal is equal to the second power threshold.

In one embodiment, the transmission power of the first sub-signal is $P_{PUSCH,b,f,c}(i,j,q_d,l)$, the $P_{PUSCH,b,f,c}(i,j,q_d,l)$ is the transmission power on the PUSCH in the i-th PUSCH transmission period on BWP b on carrier f of serving cell c, the j is an index of the parameter configuration, the $q_d$ is an index of a reference signal resource, the l is an index of a power control adjustment state, and the first sub-signal is transmitted on BWP b on carrier f of serving cell c. The specific definitions of the $P_{PUSCH,b,f,c}(i,j,q_d,l)$ is referred to 3GPP TS38.213.

In one embodiment, the transmission power of the second sub-signal is $P_{PUSCH,b,f,c}(i,j,q_d,l)$ the second sub-signal is transmitted on BWP b of carrier f of service cell c.

In one embodiment, the transmission power of the first sub-signal is $P_{PUSCH,c}(i)$, the $P_{PUSCH,c}(i)$ is the transmission power on the PUSCH in the i-th sub-frame of serving cell c, and the first sub-signal is transmitted on serving cell c, the specific definition of $P_{PUSCH,c}(i)$ is referred to 3GPP TS 36.213.

In one embodiment, the transmission power of the second sub-signal is $P_{PUSCH,c}(i)$, the second sub-signal is transmitted on serving cell c.

In one embodiment, the units of the first power threshold and the second power threshold are respectively dBm.

In one embodiment, the first power threshold is $P_{CMAX,f,c}(i)$, the $P_{CMAX,f,c}(i)$ is highest transmission power threshold configured in the i-th PUSCH transmission period on carrier f of serving cell c, the first sub-signal is transmitted on carrier f of serving cell c, the specific definitions of $P_{CMAX,f,c}(i)$ is referred to 3GPP TS38.213.

In one embodiment, the first power threshold is $P_{CMAX,c}(i)$, the $P_{CMAX,c}(i)$ is the highest transmission power threshold configured in the i-th sub-frame of serving cell c, and the first sub-signal is transmitted on serving cell c. The specific definitions of $P_{CMAX,c}(i)$ is referred to 3GPP TS 36.213.

In one embodiment, the second power threshold is $P_{CMAX,f,c}(i)$, the second sub-signal is transmitted on carrier f of serving cell c.

In one embodiment, the second power threshold is $P_{CMAX,c}(i)$, the second sub-signal is transmitted on serving cell c.

In one embodiment, the second power threshold is $10 \log_{10}(\hat{P}_{CMAX,f,c}(i)-\hat{P}_1)$, where the $\hat{P}_{CMAX,f,c}(i)$ is a linear value of the $P_{CMAX,f,c}(i)$, the $\hat{P}_1$ is a linear value of the transmission power of the first sub-signal.

In one embodiment, the second power threshold is $10 \log_{10}(\hat{P}_{CMAX,c}(i)-\hat{P}_1)$, where the $\hat{P}_{CMAX,c}(i)$ is a linear value of the $P_{CMAX,c}(i)$.

In one embodiment, the first power threshold is equal to the second power threshold.

In one embodiment, the unit of the first desired power is dBm.

In one embodiment, the first desired power is related to an index j of a parameter set configuration, and the specific definition of the index j of the parameter configuration is referred to 3GPP TS 38.213.

In one embodiment, the first desired power is related to scheduling type j, and the specific definition of the scheduling type j is referred to 3GPP TS 36.213.

In one embodiment, the first desired power is $P_{o\_PUSCH,f,c}(j)$, the $P_{o\_PUSCH,f,c}(j)$ is the desired power related to parameter configuration j on carrier f of serving cell c, and the first sub-signal is transmitted on carrier f of serving cell c. The specific definitions of $P_{o\_PUSCH,f,c}(j)$ is referred to 3GPP TS38.213.

In one embodiment, the first desired power is $P_{o\_PUSCH,c}(j)$, the $P_{o\_PUSCH,c}(j)$ is the desired power associated with the scheduling type j on serving cell c, the first sub-signal is transmitted on serving cell c. the specific definitions of $P_{o\_PUSCH,c}(j)$ is referred to 3GPP TS 36.213.

In one embodiment, the second component is related to a size of a frequency resource occupied by the first sub-signal.

In one embodiment, the second component is $10 \log_{10}(2^{\mu}M_{RB,1})$, where the $M_{RB,1}$ is a bandwidth in unit of resource block occupied by the first sub-signal, the $\mu$ is the sub-carrier spacing configuration. The specific definitions of $\mu$ is referred to 3GPP TS38.211.

In one embodiment, the second component is $10 \log_{10}(M_{RB,1})$, where the $(M_{RB,1})$ is a bandwidth in unit of resource block occupied by the first sub-signal.

In one embodiment, the first coefficient is a non-negative real number less than or equal to 1.

In one embodiment, the first coefficient is $\alpha_{b,f,c}(j)$, the $\alpha_{b,f,c}(j)$ is a partial path loss compensation factor related to parameter configuration j on BWP b on carrier f of serving cell c, the first sub-signal is transmitted on BWP b on carrier f of service cell c. The specific definitions of $\alpha_{b,f,c}(j)$ is referred to 3GPP TS38.213.

In one embodiment, the first coefficient is $\alpha_c(j)$, the $\alpha_c(j)$ is a partial path loss compensation factor associated with scheduling type j in serving cell c, the first sub-signal is transmitted on serving cell c. The specific definitions of $\alpha_c(j)$ is referred to 3GPP TS 36.213.

In one embodiment, the third component is a path loss estimate in dB.

In one embodiment, the third component is equal to the transmission power of a first given downlink reference signal minus the RSRP (Reference Signal Received Power) of the first given downlink reference signal.

As an embodiment, the third component is $PL_{b,f,c}(q_d)$, the $PL_{b,f,c}(q_d)$ is a path loss estimate in dB obtained based on a reference signal resource of index $q_d$ on BWP b on carrier f of serving cell c, and the first sub-signal is transmitted on BWP b on carrier f of serving cell c. The specific definitions of $PL_{b,f,c}(q_d)$ is referred to 3GPP TS38.213.

In one embodiment, the third component is $PL_c$, the $PL_c$ is the path loss estimate in dB in serving cell c, the first sub-signal is transmitted on serving cell c. The specific definitions of $PL_c$ is referred to 3GPP TS 36.213.

In one embodiment, the fourth component is related to the MCS of the first sub-signal.

In one embodiment, the fourth component is $\Delta_{TF,b,f,c}(i)$, the $\Delta_{TF,b,f,c}(i)$ is a power offset associated with the MCS of the first sub-signal in the i-th PUSCH transmission period on BWP b on carrier f of serving cell c, the first sub-signal is transmitted on BWP b on carrier f of serving cell c. The specific definitions of $\Delta_{TF,b,f,c}(i)$ is referred to 3GPP TS38.213.

In one embodiment, the fourth component is $\Delta_{TF,c}(i)$, the $\Delta_{TF,c}(i)$ is a power offset associated with the MCS of the first sub-signal in the i-th sub-frame of serving cell c, the first sub-signal is transmitted on serving cell c. The specific definitions of $\Delta_{TF,c}(i)$ is referred to 3GPP TS 36.213.

In one embodiment, the fifth component is a power control adjustment state.

In one embodiment, the fifth component is $f_{b,f,c}(i,l)$, the $f_{b,f,c}(i,l)$ is the lth power control adjustment state on the PUSCH in the i-th PUSCH transmission period on BWP b of carrier f of serving cell c, the first sub-signal is transmitted on BWP b on carrier f of serving cell c. The specific definitions of $f_{b,f,c}(i,l)$ is referred to 3GPP TS38.213.

In one embodiment, the fifth component is $f_c(i)$, the $f_c(i)$ is a state of power control adjustment on the PUSCH in the i-th sub-frame in serving cell c, and the first sub-signal is transmitted on serving cell c. The specific definitions of $f_c(i)$ is referred to 3GPP TS 36.213.

In one embodiment, the unit of the second desired power is dBm.

In one embodiment, the second desired power is related to an index j of a parameter set configuration, and the specific definition of the index j of the parameter configuration is referred to 3GPP TS 38.213.

In one embodiment, the second desired power is related to scheduling type j, and the specific definition of scheduling type j is referred to 3GPP TS 36.213.

In one embodiment, the second desired power is $P_{o\_PUSCH,f,c}(j)$, the second sub-signal is transmitted on carrier f of serving cell c.

In one embodiment, the second desired power is $P_{o\_PUSCH,c}(j)$, the second sub-signal is transmitted on serving cell c.

In one embodiment, the sixth component is related to the size of the frequency resource occupied by the second sub-signal.

In one embodiment, the sixth component is $10 \log_{10}(2^{\mu}M_{RB,2})$, where the $M_{RB,2}$ is a bandwidth in unit of resource block occupied by the second sub-signal, the $\mu$ is the sub-carrier spacing configuration. The specific definitions of $\mu$ is referred to 3GPP TS38.211.

In one embodiment, the sixth component is $10 \log_{10}(M_{RB,2})$, where the $M_{RB,2}$ is a bandwidth in unit of resource block occupied by the second sub-signal.

In one embodiment, the second coefficient is a non-negative real number less than or equal to 1.

In one embodiment, the second coefficient is $\alpha_{b,f,c}(j)$, the second sub-signal is transmitted on BWP b on carrier f of serving cell c.

In one embodiment, the second coefficient is $\alpha_c(j)$, the second sub-signal is transmitted on serving cell c.

In one embodiment, the seventh component is a path loss estimate in dB.

In one embodiment, the seventh component is equal to the transmission power of a second given downlink reference signal minus the RSRP of the second given downlink reference signal.

In one embodiment, the seventh component is $PL_{b,f,c}(q_d)$, the second sub-signal is transmitted on BWP b on carrier f of serving cell c.

In one embodiment, the seventh component is $PL_c$, the second sub-signal is transmitted on serving cell c.

In one embodiment, the eighth component is related to the MCS of the second sub-signal.

In one embodiment, the eighth component is $\Delta_{TF,b,f,c}(i)$, the second sub-signal is transmitted on BWP b on carrier f of serving cell c.

In one embodiment, the eighth component is $\Delta_{TF,c}(i)$, the second sub-signal is transmitted on serving cell c.

In one embodiment, the ninth component is a power control adjustment state.

In one embodiment, the ninth component is $f_{b,f,c}(i,l)$, the second sub-signal is transmitted on BWP b on carrier f of serving cell c.

In one embodiment, the ninth component is $f_c(i)$, the second sub-signal is transmitted on serving cell c.

In one embodiment, the first desired power is not equal to the second desired power.

In one embodiment, the first desired power is greater than the second desired power.

In one embodiment, the second component is equal to the sixth component, and the first sub-signal and the second sub-signal occupy equal frequency resources.

In one embodiment, the second component is not equal to the sixth component, and the sizes of the frequency resources occupied by the first sub-signal and the second sub-signal are not equal.

In one embodiment, the third component is equal to the seventh component.

In one embodiment, the first coefficient is equal to the second coefficient.

In one embodiment, the fourth component is equal to the eighth component.

In one embodiment, the fifth component is equal to the ninth component.

In one embodiment, the first desired power and the second desired power are respectively configured by higher layer signaling.

In one embodiment, the first desired power and the second desired power are respectively configured by RRC signaling.

In one embodiment, the first information in the present disclosure is used to determine at least one of the first desired power and the second desired power.

In one embodiment, the first information in the present disclosure indicates at least one of the first desired power and the second desired power.

Embodiment XIV

Figure 14:
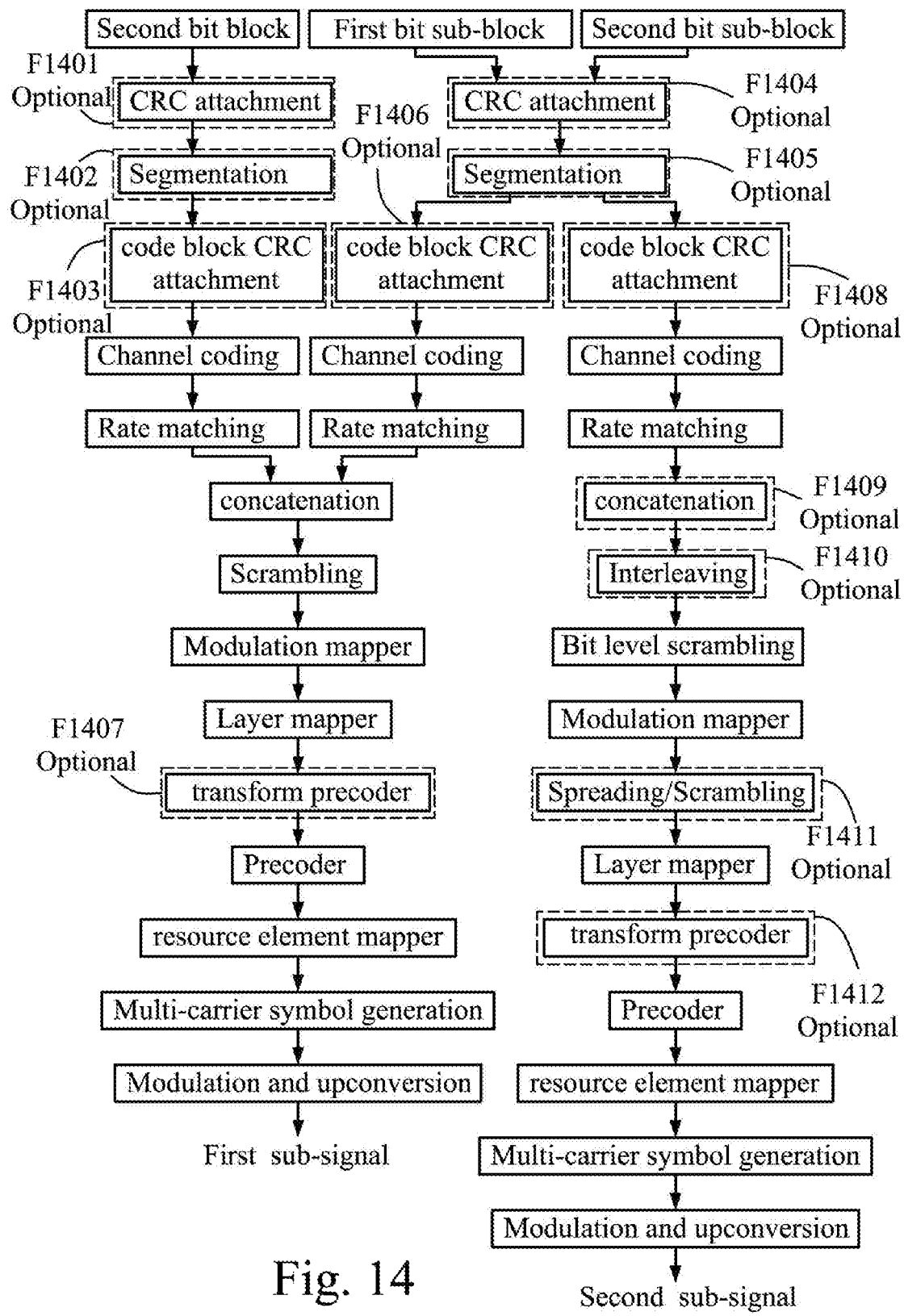
FIG. 14 shows a schematic diagram of generation of a first sub-signal and a second sub-signal according to one embodiment of the present disclosure.

Embodiment XIV illustrates a schematic diagram of the generation of the first sub-signal and the second sub-signal; as shown in FIG. 14.

In Embodiment XIV, the first time-frequency resource block in the present disclosure comprises the first time-frequency resource sub-block in the present disclosure and the second time-frequency resource sub-block in the present disclosure. The first wireless signal in the present disclosure comprises the first sub-signal and the second sub-signal, where the first sub-signal and the second sub-signal respectively occupy the resource elements of the first time-frequency resource sub-block and the resource elements in the second time-frequency resource sub-block. The first wireless signal carries a first bit block and a second bit block. The first bit block comprises a first bit sub-block and a second bit sub-block, the first sub-signal carries the first bit sub-block and the second bit block, and the second sub-signal carries the second bit sub-block.

In Embodiment XIV, the first sub-signal is an output after all or part of the bits in the first bit sub-block and the second bit block are sequentially subjected to some or all of CRC attachment, segmentation, code block CRC attachment, channel coding, rate matching, concatenation, scrambling, modulation mapper, layer mapper, transform precoder (used for generating complex-valued signals), precoding, resource element mapper, multi-carrier symbol generation, modulation and upconversion. The second sub-signal is an output after all or part of the bits in the second bit sub-block are sequentially subjected to some or all of CRC attachment, segmentation, code block CRC attachment, channel coding, rate matching, concatenation, interleaving, bit-level scrambling, modulation mapper, spreading/scrambling, layer mapper, transformer precoder, precoding, resource element mapper, multi-carrier symbol generation, modulation and upconversion. In FIG. 14, the processing steps in the dashed boxes F1401 to F1412 are optional, respectively.

In one embodiment, the multi-carrier symbol generation in FIG. 14 is an OFDM symbol generation.

In one embodiment, the multi-carrier symbol generation in FIG. 14 is an SC-FDMA symbol generation.

In one embodiment, the multi-carrier symbol generation in FIG. 14 is a DFT-S-OFDM symbol generation.

In one embodiment, the first bit sub-block includes a positive integer number of bits.

In one embodiment, all bits in the first bit sub-block are sequentially arranged.

In one embodiment, the second bit sub-block includes a positive integer number of bits.

In one embodiment, all bits in the second bit sub-block are sequentially arranged.

In one embodiment, the first bit sub-block and the second bit sub-block are different CBs (Code Blocks).

In one embodiment, the first bit sub-block and the second bit sub-block belong to different CBs.

In one embodiment, any bit in the first bit sub-block and any bit in the second bit sub-blocks belong to different CBs.

In one embodiment, the first bit sub-block and the second bit block are used to generate the first sub-signal.

In one embodiment, the second bit sub-block is used to generate the second sub-signal.

In one embodiment, the first bit block includes a first information bit block and a first check bit block, the first check bit block being generated by a CRC bit block of the first information bit block.

In a sub-embodiment of the above embodiment, the first information bit block is a TB.

In a sub-embodiment of the above embodiment, box F1404 in FIG. 14 does not exist.

In one embodiment, the first bit sub-block includes a first information bit sub-block and a first check bit sub-block, where the first check bit sub-block is generated by a CRC bit block of the first information bit sub-block. The second bit sub-block includes a second information bit sub-block and a second check bit sub-block, the second check bit sub-block being generated by a CRC bit block of the second information bit sub-block.

In a sub-embodiment of the above embodiment, the first check bit sub-block is independent of the second information bit sub-block, and the second check bit sub-block is independent of the first information bit sub-block.

In a sub-embodiment of the above embodiment, the first information bit sub-block and the second information bit sub-block are different CBs.

In a sub-embodiment of the above embodiment, box F1404, box F1405, box F1406 and F1408 in FIG. 14 are not present.

In one embodiment, the second bit block includes a second information bit block and a second check bit block, the second check bit block being generated by a CRC bit block of the second information bit block.

In a sub-embodiment of the above embodiment, box F1401 in FIG. 14 does not exist.

In one embodiment, the interleaving sequence used for interleaving in box F1410 of FIG. 14 is UE specific.

In one embodiment, the spreading/scrambling code sequence used for spreading/scrambling in box F1411 of FIG. 14 is UE specific.

In one embodiment, the scheduling information of the first wireless signal includes a first multiple access signature, and the first multiple access signature is only used to generate the second sub-signal of the first sub-signal and the second sub-signal.

In one embodiment, the first multiple access signature includes an interleaving sequence used for interleaving in box F1410 of FIG. 14.

In one embodiment, the first multiple access signature includes a spreading/scrambling code sequence used for spreading/scrambling in box F1411 of FIG. 14.

In one embodiment, the first multiple access signature includes one or more of {sequence, codebook, codeword, interleaving pattern, mapping pattern, demodulation reference signal, preamble, spatial-dimension, power-dimension}.

In one embodiment, the first information in the present disclosure is used to determine the first multiple access signature.

In one embodiment, the first information in the present disclosure indicates the first multiple access signature.

Embodiment XV

Figure 15:
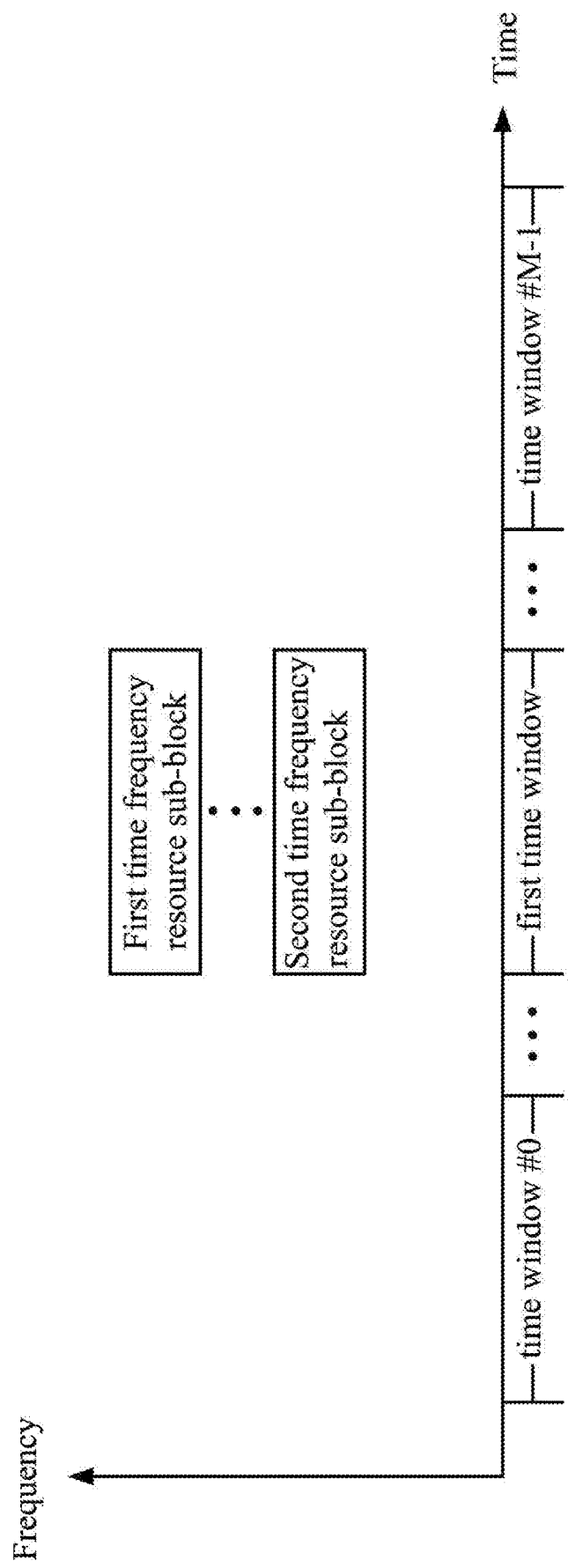
FIG. 15 shows a schematic diagram of the relationship of M time windows and {first time-frequency resource sub-blocks, second time-frequency resource sub-blocks} in the time domain according to one embodiment of the present disclosure.

Embodiment XV illustrates a schematic diagram of the relationship of M time windows and {first time-frequency resource sub-blocks, second time-frequency resource sub-blocks} in the time domain; as shown in FIG. 15.

In Embodiment XV, the first time-frequency resource block in the present disclosure includes at least the former of {the first time-frequency resource sub-block, the second time-frequency resource sub-block}. The time domain resource occupied by the first time-frequency resource block belongs to a first time window, and the first time window is one of the M time windows. In FIG. 15, the index of the M time windows are {#0, . . . , #M−1}, respectively.

In one embodiment, any one of the M time windows is a continuous time period.

In one embodiment, any one of the M time windows is a slot.

In one embodiment, any one of the M time windows is a sub-frame.

In one embodiment, any one of the M time windows includes a positive integer number of consecutive multi-carrier symbol(s).

In one embodiment, any one of the M time windows includes a positive integer number of consecutive slot(s).

In one embodiment, any one of the M time windows includes a positive integer number of consecutive sub-frame(s).

In one embodiment, any two of the M time windows are orthogonal to each other (not overlapping) in the time domain.

In one embodiment, any two adjacent time windows of the M time windows are discontinuous in the time domain.

In one embodiment, at least two adjacent time windows of the M time windows are continuous in the time domain.

In one embodiment, any two of the M time windows occupy the same length of time domain resources.

In one embodiment, at least two time windows in the M time windows occupy time domain resources of different lengths.

In one embodiment, the first time-frequency resource block occupies all or part of the time domain resources in only one of the M time windows.

In one embodiment, the time domain resource occupied by the first time-frequency resource block is the first time window.

In one embodiment, the time domain resource occupied by the first time-frequency resource sub-block is the first time window.

In one embodiment, the time domain resource occupied by the second time-frequency resource sub-block is the first time window.

Embodiment XVI

Figure 16:
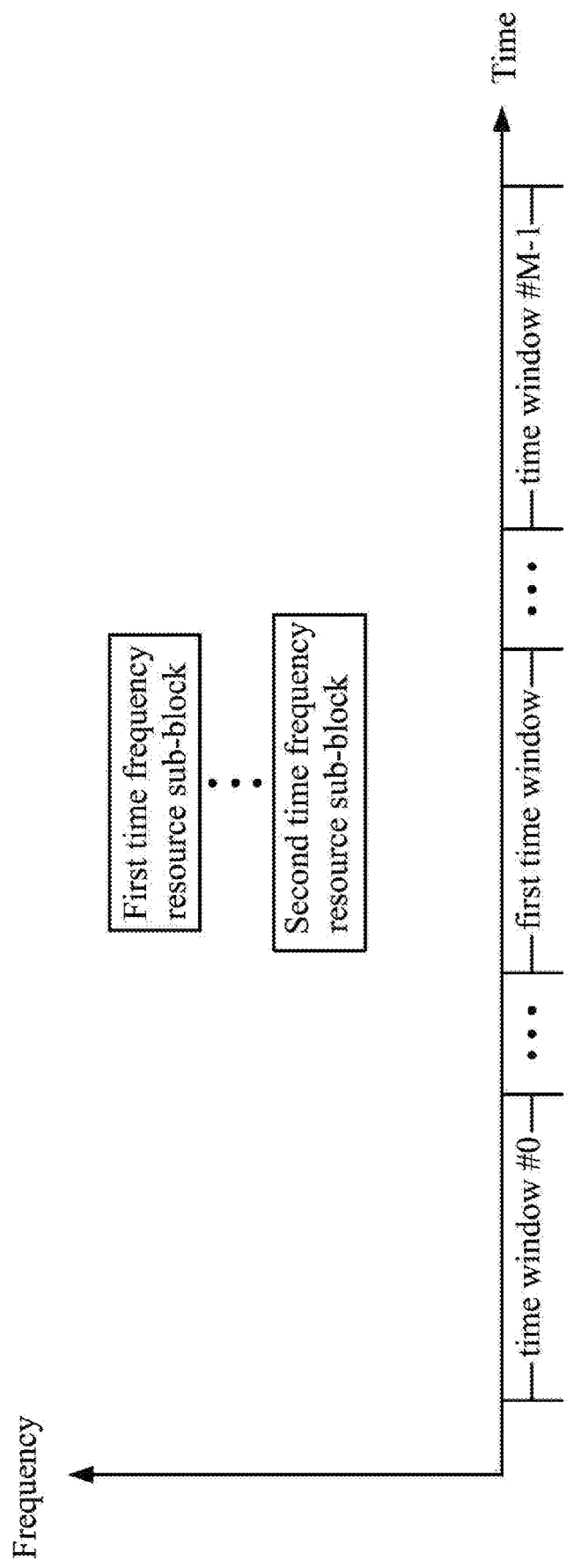
FIG. 16 shows a schematic diagram of the relationship of M time windows and {first time-frequency resource sub-blocks, second time-frequency resource sub-blocks} in the time domain according to one embodiment of the present disclosure.

Embodiment XVI illustrates a schematic diagram of the relationship of M time windows and {first time-frequency resource sub-blocks, second time-frequency resource sub-blocks} in the time domain; as shown in FIG. 16.

In Embodiment XVI, the first time-frequency resource block in the present disclosure includes at least the former of {the first time-frequency resource sub-block, the second time-frequency resource sub-block}. The time domain resource occupied by the first time-frequency resource block belongs to a first time window, and the first time window is one of the M time windows. In FIG. 16, the indices of the M time windows are {#0, . . . , #M−1}, respectively.

In one embodiment, the time domain resource occupied by the first time-frequency resource block is part of the first time window.

In one embodiment, the time domain resource occupied by the first time-frequency resource sub-block is part of the first time window.

In one embodiment, the time domain resource occupied by the second time-frequency resource sub-block is part of the first time window.

Embodiment XVII

Embodiment XVII illustrates a schematic diagram of the first signaling; as shown in FIG. 17.

In Embodiment XVII, the first signaling includes a first field, a second field, a third field, a fourth field, and a fifth field. The first field in the first signaling indicates at least the former one of {the frequency resource occupied by the first time-frequency resource sub-block in the present disclosure, the frequency resource occupied by the second time-frequency resource sub-block}; the second field in the first signaling indicates at least the former one of {the modulation and coding scheme of the first sub-signal in the present disclosure, the modulation and coding scheme of the second sub-signal in the present disclosure}; the third field in the first signaling indicates (a) transmitting antenna port(s) of the first wireless signal; the fourth field in the first signaling indicates a cyclic shift and an OCC (Orthogonal Cover Code) of a DMRS of a physical layer channel where the first wireless signal is located; the fifth field in the first signaling is a AUL DFI (Downlink Feedback Indication) flag (AUL DFI indication).

In one embodiment, the first signaling indicates at least the former one of frequency resources occupied by the first time-frequency resource sub-block and frequency resources occupied by the second time-frequency resource sub-block.

In one embodiment, the first signaling includes a first field, and the first field in the first signaling indicates at least the former one of frequency resource occupied by the first time-frequency resource sub-block and frequency resource occupied by the second time-frequency resource sub-block.

In one embodiment, the first field in the first signaling includes some or all information in an RB assignment field, and a specific definition of the RB assignment field is referred to section 5.3 in 3GPP TS36.212.

In one embodiment, the first field in the first signaling consists of 5 or 6 bits.

In one embodiment, the first signaling indicates at least the former one of the modulation and coding scheme of the first sub-signal and modulation and the coding scheme of the second sub-signal.

In one embodiment, the first signaling comprises second field, the second field in the first signaling indicates at least the former one of the modulation and coding scheme of the first sub-signal and the modulation and coding scheme of the second sub-signal.

In one embodiment, the second field in the first signaling includes some or all of the information in the MCS and RV fields. A specific definitions of the MCS and RV domains is referred to section 5.3 in 3GPP TS 36.212.

In one embodiment, the second field in the first signaling consists of 5 bits.

In one embodiment, the second field in the first signaling consists of 10 bits.

In one embodiment, the first sub-signal and the second sub-signal are transmitted by the same antenna port.

In one embodiment, the first signaling is used to determine (a) transmitting antenna port(s) of the first wireless signal.

In one embodiment, the first signaling includes a third field, and the third field in the first signaling indicates (a) transmitting antenna port(s) of the first wireless signal.

In an embodiment, the third field in the first signaling includes part or all of information in a precoding information and number of layers field, a specific definition of precoding information and number of layers field is referred to section 5.3 of 3GPP TS 36.212.

In one embodiment, the third field in the first signaling consists of 3, 4, 5 or 6 bits.

In one embodiment, the first signaling is used to determine a cyclic shift and an OCC (Orthogonal Cover Code) of a DMRS of a physical layer channel where the first wireless signal is located.

In one embodiment, the first signaling includes a fourth field, and the fourth field in the first signaling indicates a cyclic shift and OCC of a DMRS of a physical layer channel where the first wireless signal is located.

In one example, the fourth field in the first signaling comprising some or all of the information in Cyclic shift for DMRS and OCC index (DMRS cyclic shift and orthogonal mask index) field, a specific definition of Cyclic shift for DMRS and OCC index field is referred to section 5.3 of 3GPP TS 36.212.

In one embodiment, the fourth field in the first signaling consists of 3 bits.

In one embodiment, the first signaling includes a fifth field, and the fifth field in the first signaling is an AUL DFI flag.

In one embodiment, the fifth field in the first signaling consists of 1 bit.

Embodiment XVIII

Embodiment XVIII illustrates a schematic diagram of the second signaling; as shown in FIG. 18.

In Embodiment XVIII, the second signaling includes a sixth field, a seventh field, an eighth field, a ninth field, and a tenth field. The sixth field in the second signaling indicates the first sub-band in the present disclosure; the seventh field in the second signaling is an AUL DFI flag (AUL DFI indication); the eighth field in the second signaling indicates whether the first bit block in the present disclosure is correctly received; the ninth field in the second signaling indicates a TPC (Transmitter Power Control); the tenth field in the second signaling indicates a TPMI (Transmitted Precoding Matrix Indicator).

In one embodiment, the second signaling indicates whether a first bit sub-block and a second bit sub-block are correctly received, respectively; the first bit sub-block is composed of all bits carried by the first sub-signal in this disclosure in the first bit block, and the second bit sub-block is composed of all bits carried by the second sub-signal in this disclosure in the first bit block.

In one embodiment, the second signaling includes an AUL-DFI (Downlink Feedback Indication).

In one embodiment, the second signaling indicates the first sub-band.

In one embodiment, the second signaling includes a sixth field, and the sixth field in the second signaling indicates the first sub-band.

In one embodiment, the sixth field in the second signaling includes part or all of the information in a carrier indicator field. A specific definition of the carrier indicator field is referred to section 5.3 in 3GPP TS36.212.

In one embodiment, the sixth field in the second signaling consists of 3 bits.

In one embodiment, the second signaling includes a seventh field, and the seventh field in the second signaling is an AUL DFI flag.

In one embodiment, the seventh field in the second signaling is composed of 1 bit.

In one embodiment, the second signaling includes an eighth field, and the eighth field in the second signaling indicates whether the first bit block is correctly received.

In one embodiment, the eighth field in the second signaling respectively indicates whether the first bit sub-block and the second bit sub-block are correctly received.

In one embodiment, the eighth field in the second signaling is a HARQ-Ack (Acknowledgement) bitmap.

In one embodiment, the second signaling includes a ninth field, and the ninth field in the second signaling indicates a TPC (Transmitter Power Control).

In one embodiment, the ninth field in the second signaling includes part or all of information in a TPC command for scheduled PUSCH field, and a specific definition of TPC command for scheduled PUSCH field is referred to Section 5.3 of 3GPP TS 36.212.

In an embodiment, the second signaling includes a tenth field, the tenth field in the second signaling includes part or all of the information in a Precoding information and number of layers field. A specific definition of the Precoding information and number of layers field is referred to section 5.3 of 3GPP TS 36.212.

In one embodiment, the tenth field in the second signaling consists of 3, 4,5 or 6 bits.

Embodiment XIX

Figure 19:
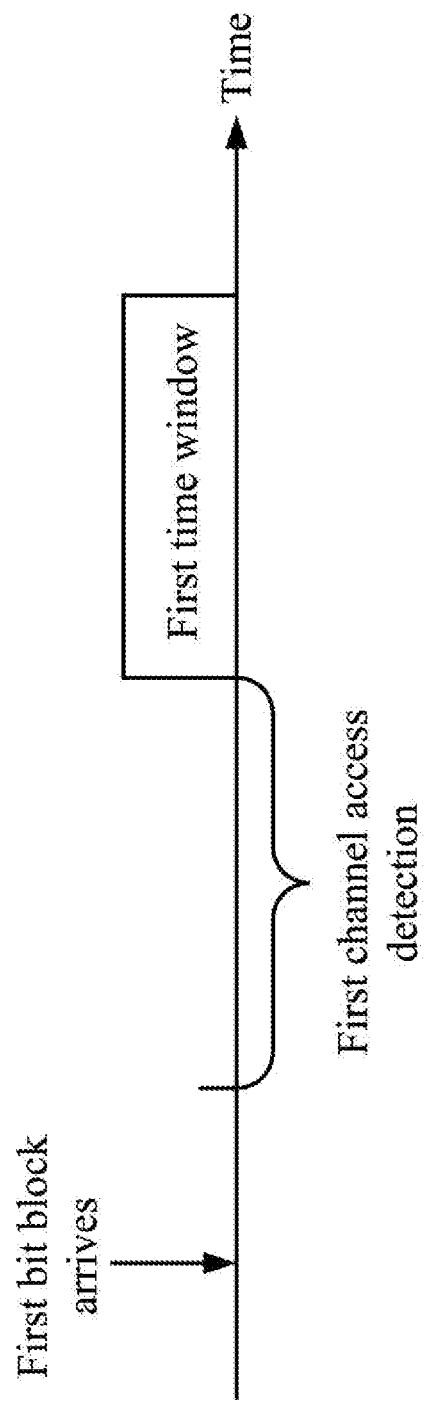
FIG. 19 shows a schematic diagram of a user equipment determining a first time window by itself in M time windows according to one embodiment of the present disclosure.

Embodiment XIX illustrates schematic diagram of a user equipment determining a first time window by itself in M time windows; as shown in FIG. 19.

In Embodiment XIX, the user equipment transmits the first wireless signal in the present disclosure in the first time-frequency resource block in the present disclosure, and the time domain resource occupied by the first time-frequency resource block belongs to the first time window, the first time window is one of the M time windows. The user equipment determines the first time window by itself in the M time windows. The first wireless signal carries the first bit block in the present disclosure. The initial time of the first time window is later than the arrival time of the first bit block. The first channel access detection in the present disclosure is used to determine the first time window by itself in the M time windows.

In one embodiment, the arrival time of the first bit block refers to the time when the first bit block reaches the physical layer.

In one embodiment, the first channel access detection is used to determine the first time window by itself in the M time windows.

In one embodiment, the first channel access detection is used to determine that the first sub-band in the present disclosure can be used to transmit a wireless signal in the first time window.

In one embodiment, the first channel access detection is used to determine that the first sub-band in the present disclosure is idle in the first time window.

In one embodiment, the first time window is that an earliest one in the M time windows which has an initial time later than the arrival time of the first bit block and in which it is determined that the first sub-band can be used to transmit a wireless signal.

In one embodiment, the first time window is an earliest time window in the M time windows which has a starting time later than the arrival time of the first bit block and in which the first sub-band is determined to be idle.

Embodiment XX

Figure 20:
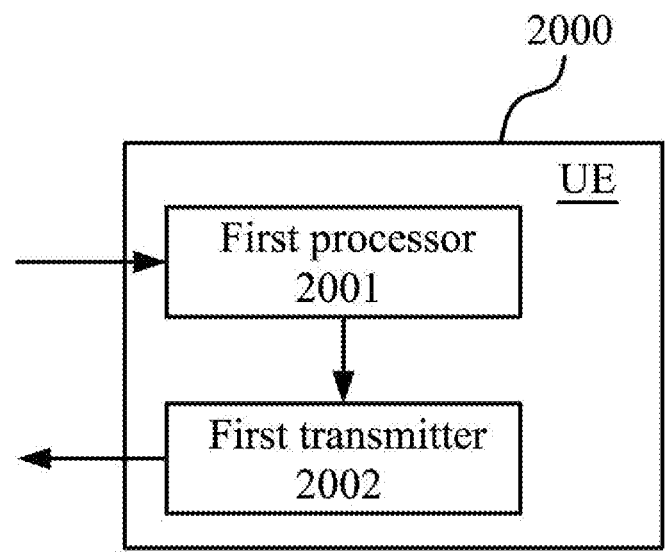
FIG. 20 shows a structural block diagram of a processing device in the user equipment according to one embodiment of the present disclosure.

Embodiment XX illustrates a structural block diagram of a processing device in the user equipment; as shown in FIG. 20. In FIG. 20, the processing device 2000 in the user equipment is primarily comprised of a first processor 2001 and a first transmitter 2002.

In Embodiment XX, the first processor 2001 determines a first time-frequency resource block by itself on a first sub-band; the first transmitter 2002 transmits a first wireless signal in the first time-frequency resource block in the first sub-band.

In Embodiment XX, the first wireless signal carries a first bit block and a second bit block; the first time-frequency resource block comprises a first time-frequency resource sub-block, and whether the first time-frequency resource block comprises the second time-frequency resource sub-block is related to a number of bits included in the first bit block; the second bit block is used to determine the first time-frequency resource block, and the second bit block only occupies resource elements in the first time-frequency resource sub-block; the first time-frequency resource sub-block and the second time-frequency resource sub-block respectively comprise a positive integer number of resource elements.

In one embodiment, the first processor 2001 also performs a first channel access detection in the first sub-band; wherein the first access channel access detection is used to determine that the first wireless signal can be transmitted in the first time-frequency resource block in the first sub-band.

In one embodiment, the first time-frequency resource block comprises the second time-frequency resource sub-block; the first wireless signal comprises a first sub-signal and a second sub-signal, the first sub-signal and the second sub-signals respectively occupy the resource elements in the first time-frequency resource sub-block and resource elements in the second time-frequency resource sub-block; transmission power of the first sub-signal and transmission power of the second sub-signal are not equal.

In one embodiment, the first time-frequency resource block comprises the second time-frequency resource sub-block; the first wireless signal comprises a first sub-signal and a second sub-signal, the first sub-signal and the second sub-signals respectively occupy the resource elements in the first time-frequency resource sub-block and resource elements in the second time-frequency resource sub-block; the first sub-signal and the second sub-signal are corresponding to different modulation and coding schemes.

In one embodiment, the first time-frequency resource block comprises the second time-frequency resource sub-block; the first wireless signal comprises a first sub-signal and a second sub-signal, the first sub-signal and the second sub-signals respectively occupy the resource elements in the first time-frequency resource sub-block and the resource elements in the second time-frequency resource sub-block; scheduling information of the first wireless signal comprises a first multiple access signature, the first multiple access signature is only used to generate the second sub-signal of the first sub-signal and the second sub-signal.

In one embodiment, the first processor 2001 further receives first information; wherein the first information is used to determine M time windows, a time domain resource occupied by the first time-frequency resource block belonging to a time window of the M time windows; the M being a positive integer greater than one.

In one embodiment, the first processor 2001 further determines a first time window by itself in the M time windows; wherein the time domain resource occupied by the first time-frequency resource block belongs to the first time window.

In one embodiment, the first processor 2001 further receives a first signaling; wherein the first signaling is used to determine at least a former one of the first time-frequency resource sub-block and the second time-frequency resource sub-block.

In one embodiment, the first processor 2001 further receives a second signaling; wherein the second signaling indicates whether the first bit block is received correctly.

In one embodiment, the first processor 2001 includes the at least one of {the antenna 452, the receiver 454, the receiving processor 456, the multi-antenna receiving processor 458, the controller/processor 459, the memory 460, and the data source 467} in the embodiment IV In one embodiment, the first transmitter 2002 includes at least one of {the antenna 452, the transmitter 454, the transmitting processor 468, the multi-antenna transmitting processor 457, the controller/processor 459, the memory 460, and the data source 467} in the embodiment IV.

Embodiment XXI

Figure 21:
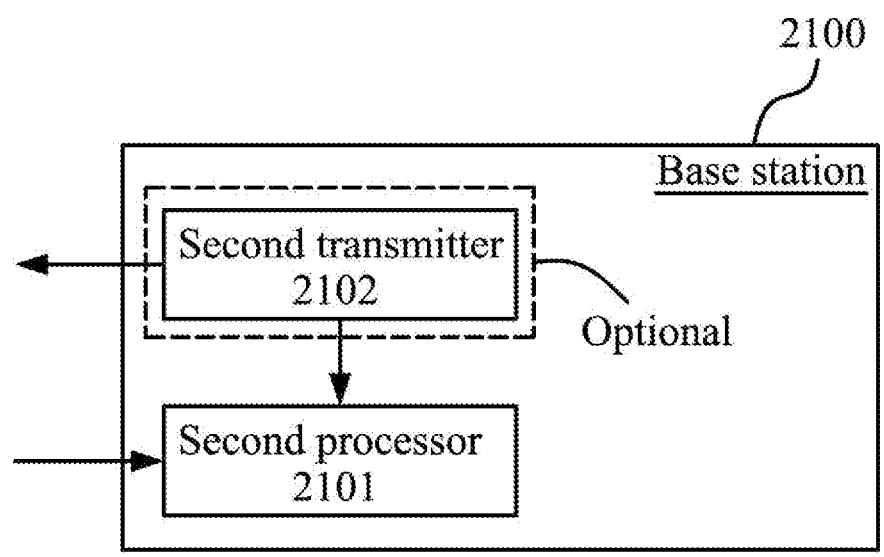
FIG. 21 shows a structural block diagram of a processing device in the base station equipment according to one embodiment of the present disclosure.

Embodiment XXI illustrates a structural block diagram of a processing device in the base station equipment, as shown in FIG. 21. In FIG. 21, the processing device 2100 in the base station equipment is primarily comprised of a second processor 2101 and a second transmitter 2102.

In Embodiment XXI, the second processor 2101 determines whether a first time-frequency resource block on a first sub-band comprises a second time-frequency resource sub-block, and receives a first wireless signal in the first time-frequency resource block in the first sub-band; the second transmitter 2102 transmits first information. In FIG. 21, the second transmitter 2102 is optional.

In Embodiment XXI, the first wireless signal carries a first bit block and a second bit block; the first time-frequency resource block comprises a first time-frequency resource sub-block, and whether the first time-frequency resource block comprises the second time-frequency resource sub-block is related to a number of bits included in the first bit block; the second bit block is used by the second processor 2101 to determine the first time-frequency resource block, the second bit block occupies only resource elements in the first time-frequency resource sub-block; the first time-frequency resource sub-block and the second time-frequency resource sub-block respectively comprise a positive integer number of resource elements. The first information is used to determine M time windows, and a time domain resource occupied by the first time-frequency resource block belongs to one time window of the M time windows; the M is a positive integer greater than 1.

In one embodiment, the first time-frequency resource block comprises the second time-frequency resource sub-block; the first wireless signal comprises a first sub-signal and a second sub-signal, the first sub-signal and the second sub-signals respectively occupy the resource elements in the first time-frequency resource sub-block and resource elements in the second time-frequency resource sub-block; transmission power of the first sub-signal and transmission power of the second sub-signal are not equal.

In one embodiment, the first time-frequency resource block comprises the second time-frequency resource sub-block; the first wireless signal comprises a first sub-signal and a second sub-signal, where the first sub-signal and the second sub-signals respectively occupy the resource elements in the first time-frequency resource sub-block and resource elements in the second time-frequency resource sub-block; the first sub-signal and the second sub-signal are corresponding to different modulation and coding schemes.

In one embodiment, the first time-frequency resource block comprises the second time-frequency resource sub-block; the first wireless signal comprises a first sub-signal and a second sub-signal, where the first sub-signal and the second sub-signals respectively occupy the resource elements in the first time-frequency resource sub-block and resource elements in the second time-frequency resource sub-block; scheduling information of the first wireless signal comprises a first multiple-access signature, where the first multiple-access signature is only used to generate the second sub-signal of the first sub-signal and the second sub-signal.

In one embodiment, the second processor 2101 further monitors the first wireless signal in the M time windows, and successfully detects the first wireless signal in a first time window; wherein, the time domain resource occupied by the first time-frequency resource block belongs to the first time window.

In one embodiment, the second transmitter 2102 further transmits the first signaling, wherein, the first signaling is used to determine at least a former one of the first time-frequency resource sub-block and the second time-frequency resource sub-block.

In one embodiment, the second transmitter 2102 also transmits the second signaling; wherein, the second signaling indicates whether the first bit block is correctly received.

In one embodiment, the second processor 2101 includes at least one of {the antenna 420, the receiver 418, the receiving processor 470, the multi-antenna receiving processor 472, the controller/processor 475, and the memory 476} in the embodiment IV.

In one embodiment, the second transmitter 2102 includes at least one of {the antenna 420, the transmitter 418, the transmitting processor 416, the multi-antenna transmitting processor 471, the controller/processor 475, and the memory 476} in the embodiment IV One of ordinary skill in the art can appreciate that all or part of the above steps can be completed by a program to instruct related hardware, and the program can be stored in a computer readable storage medium such as a read only memory, a hard disk or an optical disk. Alternatively, all or part of the steps of the above embodiments may also be implemented using one or more integrated circuits. Correspondingly, each module unit in the above embodiment may be implemented in hardware form or in the form of a software function module. The application is not limited to any specific combination of software and hardware. The user equipment, terminal and UE in the present disclosure include but are not limited to a drone, a communication module on the drone, a remote control aircraft, an aircraft, a small aircraft, a mobile phone, a tablet computer, a notebook, a vehicle communication device, a wireless sensor, an internet card, Internet of Things terminal, RFID terminal, NB-IOT terminal, MTC (Machine Type Communication) terminal, eMTC (enhanced MTC), data card, network card, vehicle communication device, low-cost mobile phone, low Cost equipment such as tablets. The base station in the present disclosure includes, but is not limited to, a macro communication base station, a micro cell base station, a home base station, a relay base station, a gNB (NR Node B), a TRP (Transmitter Receiver Point), and the like.

Although the present disclosure is illustrated and described with reference to specific embodiments, those skilled in the art will understand that many variations and modifications are readily attainable without departing from the spirit and scope thereof as defined by the appended claims and their legal equivalents.

What is claimed is:

1. A method for wireless communication in a user equipment (UE), comprising:
    determining by the UE in a first sub-band whether a first time-frequency resource block comprises a second time-frequency resource sub-block according to a quantity of bits included in a first bit block; wherein if the quantity of bits included in the first bit block is greater than a first threshold, the first time-frequency resource block comprises the second time-frequency resource sub-block; if the quantity of bits included in the first bit block is not greater than the first threshold, the first time-frequency resource block does not comprise the second time-frequency resource sub-block, and the first threshold is a positive integer; and
    transmitting a first wireless signal in the first time-frequency resource block in the first sub-band;
    wherein the first wireless signal carries the first bit block and a second bit block;
    the first time-frequency resource block comprises a first time-frequency resource sub-block;
    the second bit block carries a first sub-information, and the first sub-information explicitly indicates whether the first time-frequency resource block comprises the second time-frequency resource sub-block, and the second bit block only occupies resource elements in the first time-frequency resource sub-block;
    the first time-frequency resource sub-block and the second time-frequency resource sub-block respectively comprise a positive integer number of resource elements, time domain resources occupied by the first time-frequency resource sub-block and the second time-frequency resource sub-block are completely or partially overlapping.

2. The method of claim 1, wherein the first time-frequency resource sub-block is exclusive to the user equipment, and the second time-frequency resource sub-block may be shared by plurality of UEs including the user equipment.

3. The method of claim 1, wherein the first time-frequency resource block comprises the second time-frequency resource sub-block, and the first wireless signal comprises a first sub-signal and a second sub-signal, the first sub-signal and the second sub-signal respectively occupy the resource elements in the first time-frequency resource sub-block and resource elements in the second time-frequency resource sub-block, transmission power of the first sub-signal and transmission power of the second sub-signal are not equal;
- the transmission power of the first sub-signal is a minimum of a first power and a first power threshold, and the transmission power of the second sub-signal is a minimum of a second power and a second power threshold;
- the first power and a first desired power is linearly correlated, and a linear coefficient between the first power and the first desired power is 1;
- the second power and a second desired power is linearly correlated, and a linear coefficient between the second power and the second desired power is 1;
- the first desired power is greater than the second desired power.

4. The method of claim 1, further comprising:
performing a first channel access detection in the first sub-band, wherein the first channel access detection is used to determine that the first wireless signal can be transmitted in the first time-frequency resource block in the first sub-band;
or, comprising:
receiving first information, wherein the first information is used to determine M time windows, and a time domain resource occupied by the first time-frequency resource block belongs to a time window of the M time windows, wherein the M is a positive integer greater than 1;
or, comprising:
receiving first information,
determine a first time window by the UE in M time windows,
wherein the first information is used to determine the M time windows, and a time domain resource occupied by the first time-frequency resource block belongs to a time window of the M time windows, wherein the M is a positive integer greater than 1, the time domain resource occupied by the first time-frequency resource block belongs to the first time window.

5. The method of claim 1, further comprising:
receiving a first signaling, wherein the first signaling indicates a frequency resource occupied by the first time-frequency resource sub-block and a frequency resource occupied by the second time-frequency resource sub-block, and the first signaling includes DCI.

6. A method for wireless communication in a base station, comprising:
- determining whether a first time-frequency resource block in a first sub-band comprises a second time-frequency resource sub-block, and receiving a first wireless signal in the first time-frequency resource block in the first sub-band;
- wherein the first wireless signal carries a first bit block and a second bit block;
- the first time-frequency resource block comprises a first time-frequency resource sub-block, and whether the first time-frequency resource block comprises the second time-frequency resource sub-block is determined by a transmitter of the first wireless signal according to a quantity of bits included in the first bit block, if the quantity of bits included in the first bit block is greater than a first threshold, the first time-frequency resource block comprises the second time-frequency resource sub-block, if the quantity of bits included in the first bit block is not greater than the first threshold, the first time-frequency resource block does not comprise the second time-frequency resource sub-block, the first threshold is a positive integer;
- the second bit block carries a first sub-information, and the first sub-information explicitly indicates whether the first time-frequency resource block comprises the second time-frequency resource sub-block, and the second bit block only occupies resource elements in the first time-frequency resource sub-block;
- the second bit block is used by the base station to determine whether the first time-frequency resource block comprises the second time-frequency resource sub-block;
- the first time-frequency resource sub-block and the second time-frequency resource sub-block respectively comprise a positive integer number of resource elements, time domain resources occupied by the first time-frequency resource sub-block and the second time-frequency resource sub-block are completely or partially overlapping.

7. The method of claim 6, wherein the first time-frequency resource block comprises the second time-frequency resource sub-block, and the first wireless signal comprises a first sub-signal and a second sub-signal, the first sub-signal and the second sub-signal respectively occupy the resource elements in the first time-frequency resource sub-block and resource elements in the second time-frequency resource sub-block, transmission power of the first sub-signal and transmission power of the second sub-signal are not equal;
- the transmission power of the first sub-signal is a minimum of a first power and a first power threshold, and the transmission power of the second sub-signal is a minimum of a second power and a second power threshold;
- the first power and a first desired power is linearly correlated, and a linear coefficient between the first power and the first desired power is 1;
- the second power and a second desired power is linearly correlated, and a linear coefficient between the second power and the second desired power is 1; and
- the first desired power is greater than the second desired power.

8. The method of claim 6, further comprising:
transmitting first information;
wherein the first information is used to determine M time windows, and a time domain resource occupied by the first time-frequency resource block belongs to a time window of the M time windows; the M is a positive integer greater than 1;
or, comprising:
transmitting first information;
monitoring the first wireless signal in M time windows, and successfully detecting the first wireless signal in a first time window;
wherein the first information is used to determine the M time windows, and a time domain resource occupied by the first time-frequency resource block belongs to a time window of the M time windows; the M is a positive integer greater than 1, the time domain resource occupied by the first time-frequency resource block belongs to the first time window.

9. The method of claim 6, further comprising:
transmitting a first signaling, wherein the first signaling indicates a frequency resource occupied by the first time-frequency resource sub-block and a frequency resource occupied by the second time-frequency resource sub-block, and the first signaling includes DCI.

10. A user equipment (UE) for a wireless communication, comprising:
a first processor, to determine by the UE in a first sub-band whether a first time-frequency resource block comprises a second time-frequency resource sub-block according to a quantity of bits included in a first bit block, if the quantity of bits included in the first bit block is greater than a first threshold, the first time-frequency resource block comprises the second time-frequency resource sub-block, if the quantity of bits included in the first bit block is not greater than the first threshold, the first time-frequency resource block does not comprise the second time-frequency resource sub-block, the first threshold is a positive integer; and
a first transmitter, to transmit a first wireless signal in the first time-frequency resource block in the first sub-band;
wherein the first wireless signal carries the first bit block and a second bit block;
the first time-frequency resource block comprises a first time-frequency resource sub-block;
the second bit block carries a first sub-information, and the first sub-information explicitly indicates whether the first time-frequency resource block comprises the second time-frequency resource sub-block, and the second bit block only occupies resource elements in the first time-frequency resource sub-block;
the first time-frequency resource sub-block and the second time-frequency resource sub-block respectively comprise a positive integer number of resource elements, time domain resources occupied by the first time-frequency resource sub-block and the second time-frequency resource sub-block are completely or partially overlapping.

11. The UE of claim 10, wherein the first time-frequency resource sub-block is exclusive to the user equipment, and the second time-frequency resource sub-block may be shared by plurality of UEs including the user equipment.

12. The UE of claim 10, wherein the first time-frequency resource block comprises the second time-frequency resource sub-block, and the first wireless signal comprises a first sub-signal and a second sub-signal, the first sub-signal and the second sub-signal respectively occupy the resource elements in the first time-frequency resource sub-block and resource elements in the second time-frequency resource sub-block, transmission power of the first sub-signal and transmission power of the second sub-signal are not equal;
the transmission power of the first sub-signal is a minimum of a first power and a first power threshold, and the transmission power of the second sub-signal is a minimum of a second power and a second power threshold;
the first power and a first desired power is linearly correlated, and a linear coefficient between the first power and the first desired power is 1;
the second power and a second desired power is linearly correlated, and a linear coefficient between the second power and the second desired power is 1; and the first desired power is greater than the second desired power.

13. The UE of claim 10, wherein the first processor performs first channel access detection in the first sub-band, wherein the first channel access detection is used to determine that the first wireless signal can be transmitted in the first time-frequency resource block in the first sub-band;
or, the first processor receives first information, wherein the first information is used to determine M time windows, a time domain resource occupied by the first time-frequency resource block belongs to a time window of the M time windows, the M is a positive integer greater than 1;
or, the first processor receives first information and determines a first time window in M time windows, wherein the first information is used to determine the M time windows, a time domain resource occupied by the first time-frequency resource block belongs to a time window of the M time windows, and the M is a positive integer greater than 1, and the time domain resource occupied by the first time-frequency resource block belongs to the first time window.

14. The UE of claim 10, wherein the first processor receives a first signaling, wherein the first signaling indicates a frequency resource occupied by the first time-frequency resource sub-block and a frequency resource occupied by the second time-frequency resource sub-block, and the first signaling includes DCI.

15. A base station equipment for a wireless communication, comprising:
a second processor, to determine whether a first time-frequency resource block in a first sub-band comprises a second time-frequency resource sub-block, and receive a first wireless signal in the first time-frequency resource block on the first sub-band;
wherein the first wireless signal carries a first bit block and a second bit block;
the first time-frequency resource block comprises a first time-frequency resource sub-block, and whether the first time-frequency resource block comprises the second time-frequency resource sub-block is determined by a transmitter of the first wireless signal according to a quantity of bits included in the first bit block, if the quantity of bits included in the first bit block is greater than a first threshold, the first time-frequency resource block comprises the second time-frequency resource sub-block, if the quantity of bits included in the first bit block is not greater than the first threshold, the first time-frequency resource block does not comprise the second time-frequency resource sub-block, the first threshold is a positive integer;
the second bit block carries a first sub-information, and the first sub-information explicitly indicates whether the first time-frequency resource block comprises the second time-frequency resource sub-block, and the second bit block only occupies resource elements in the first time-frequency resource sub-block;
the second bit block is used by the base station to determine whether the first time-frequency resource block comprises the second time-frequency resource sub-block;
the first time-frequency resource sub-block and the second time-frequency resource sub-block respectively comprise a positive integer number of resource elements, time domain resources occupied by the first time-frequency resource sub-block and the second time-frequency resource sub-block are completely or partially overlapping.

16. A base station equipment of claim 15, wherein the first time-frequency resource block comprises the second time-frequency resource sub-block, and the first wireless signal comprises a first sub-signal and a second sub-signal, the first sub-signal and the second sub-signal respectively occupy the resource elements in the first time-frequency resource sub-block and resource elements in the second time-frequency resource sub-block, transmission power of the first sub-signal and transmission power of the second sub-signal are not equal;
- the transmission power of the first sub-signal is a minimum of a first power and a first power threshold, and the transmission power of the second sub-signal is a minimum of a second power and a second power threshold;
- the first power and a first desired power is linearly correlated, and a linear coefficient between the first power and the first desired power is 1;
- the second power and a second desired power is linearly correlated, and a linear coefficient between the second power and the second desired power is 1; and
- the first desired power is greater than the second desired power.

17. The base station equipment of claim 15, further comprising:
- a second transmitter, to transmit first information;
- wherein the first information is used to determine M time windows, and a time domain resource occupied by the first time-frequency resource block belongs to a time window of the M time windows, the M is a positive integer greater than 1;

or, comprising:
- a second transmitter, to transmit first information, monitor the first wireless signal in M time windows, and successfully detect the first wireless signal in a first time window;
- wherein the first information is used to determine the M time windows, and a time domain resource occupied by the first time-frequency resource block belongs to a time window of the M time windows, the M is a positive integer greater than 1, the time domain resource occupied by the first time-frequency resource block belongs to the first time window.

18. The base station equipment of claim 17, wherein the first signaling indicates a frequency resource occupied by the first time-frequency resource sub-block and a frequency resource occupied by the second time-frequency resource sub-block, and the first signaling includes DCI.

19. The method of claim 6, wherein the first time-frequency resource sub-block is exclusive to the user equipment, and the second time-frequency resource sub-block may be shared by plurality of UEs including the user equipment.

20. A base station equipment of claim 15, wherein the first time-frequency resource sub-block is exclusive to the user equipment, and the second time-frequency resource sub-block may be shared by plurality of UEs including the user equipment.

* * * * *